United States Patent
McDaniel et al.

(10) Patent No.: US 11,797,920 B1
(45) Date of Patent: Oct. 24, 2023

(54) CUSTOMIZED RETAIL ENVIRONMENTS

(71) Applicant: Amazon Technologies, Inc., Seattle, WA (US)

(72) Inventors: Aaron M. McDaniel, Seattle, WA (US); Nirmal Doshi, Bothell, WA (US); Nathan P. O'Neill, Snohomish, WA (US); Michael Joseph Ausich, Bainbridge Island, WA (US); Joel Stirling, Everett, WA (US); Joseph W. Chauvin, Sammamish, WA (US); Willy Scott Mordant, Seattle, WA (US); Nir Charny, Redmond, WA (US); Kaigene Jennifer Lin, Bellevue, WA (US); Spencer Ralph Dodge, Covington, WA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 16/806,484

(22) Filed: Mar. 2, 2020

(51) Int. Cl.
*G06Q 10/087* (2023.01)
*G06Q 30/0283* (2023.01)
*G06Q 20/08* (2012.01)
*G01G 19/414* (2006.01)
*G01G 23/34* (2006.01)
(Continued)

(52) U.S. Cl.
CPC ......... *G06Q 10/087* (2013.01); *G01G 19/414* (2013.01); *G01G 23/34* (2013.01); *G06F 16/9535* (2019.01); *G06Q 20/085* (2013.01); *G06Q 30/0283* (2013.01); *G06V 40/172* (2022.01); *G06N 20/00* (2019.01)

(58) Field of Classification Search
CPC ............... G06Q 10/087; G06Q 20/085; G06Q 30/0283; G01G 19/414; G01G 23/34; G06F 16/9535; G06V 40/172; G06N 20/00
See application file for complete search history.

(56) References Cited

U.S. PATENT DOCUMENTS 9,117,106 B2 * 8/2015 Dedeoglu .............. G06V 20/64
9,235,928 B2 * 1/2016 Medioni ................. G06T 17/00
(Continued)

OTHER PUBLICATIONS

Office Action for U.S. Appl. No. 16/806,573, dated Mar. 8, 2021, McDaniel, "Customized Retail Environments", 5 Pages.
(Continued)

*Primary Examiner* — Michael Jared Walker
(74) *Attorney, Agent, or Firm* — Lee & Hayes, P.C.

(57) ABSTRACT

This disclosure describes, in part, systems for enabling physical retail stores and other facilities to implement automated-checkout techniques for the purchase of items that are priced per unit weight. For example, the described systems may enable a facility to implement technology where users are able to remove items from inventory locations, where the inventory locations include weight sensors detecting the weights of the items that were removed. The system then determines the prices based on the weights and charges the users for the prices of the items without performing manual checkout of the items. The price of an item is determined based on the weight of the item and the price per unit weight of the item. The systems described herein thus enable customized retail facilities, as opposed to a retail facility that allows automated-checkout only for prepackaged-type or otherwise non-customizable merchandise.

19 Claims, 13 Drawing Sheets

(51) Int. Cl.
    *G06F 16/9535*    (2019.01)
    *G06V 40/16*     (2022.01)
    *G06N 20/00*     (2019.01)

(56) References Cited

U.S. PATENT DOCUMENTS

| | | | | |
|---|---|---|---|---|
| 9,473,747 | B2 * | 10/2016 | Kobres | G06Q 30/00 |
| 9,536,236 | B2 * | 1/2017 | Hay | G07G 1/0036 |
| 10,943,285 | B1 * | 3/2021 | Grigsby | H04L 67/146 |
| 10,963,834 | B1 * | 3/2021 | Thurston | G06Q 10/087 |
| 2006/0032915 | A1 * | 2/2006 | Schwartz | G07F 7/02 |
| | | | | 235/383 |
| 2013/0284806 | A1 * | 10/2013 | Margalit | G07G 1/0009 |
| | | | | 235/382 |
| 2015/0012396 | A1 * | 1/2015 | Puerini | G06V 20/52 |
| | | | | 705/28 |
| 2018/0150685 | A1 * | 5/2018 | Ebrom | G06V 40/10 |
| 2018/0285902 | A1 * | 10/2018 | Nazarian | G06Q 10/087 |
| 2019/0087966 | A1 * | 3/2019 | Abdoo | G06F 3/167 |
| 2019/0333039 | A1 * | 10/2019 | Glaser | G06Q 20/201 |
| 2021/0125341 | A1 * | 4/2021 | Mirza | G06T 7/13 |

OTHER PUBLICATIONS

Office Action for U.S. Appl. No. 16/806,573, dated Jan. 24, 2022, McDaniel, "Customized Retail Environments", 4 Pages.
Office Action for U.S. Appl. No. 16/806,573, dated Jun. 18, 2021, McDaniel, "Customized Retail Environments",5 pages.
Office Action for U.S. Appl. No. 16/806,573, dated May 20, 2022, McDaniel, "Customized Retail Environments", 5 Pages.

* cited by examiner

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. In some instances, a price of an item may be based on a weight of the item. For example, a user may want to purchase a given number of items of a type of fruit, such as oranges. When the user takes the oranges to the cashier, the cashier may place the oranges on a scale that measures the weight of the oranges. The cashier may then determine the price for the oranges that is based on the weight. After determining the price, the cashier charges the customer for the price of the oranges.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
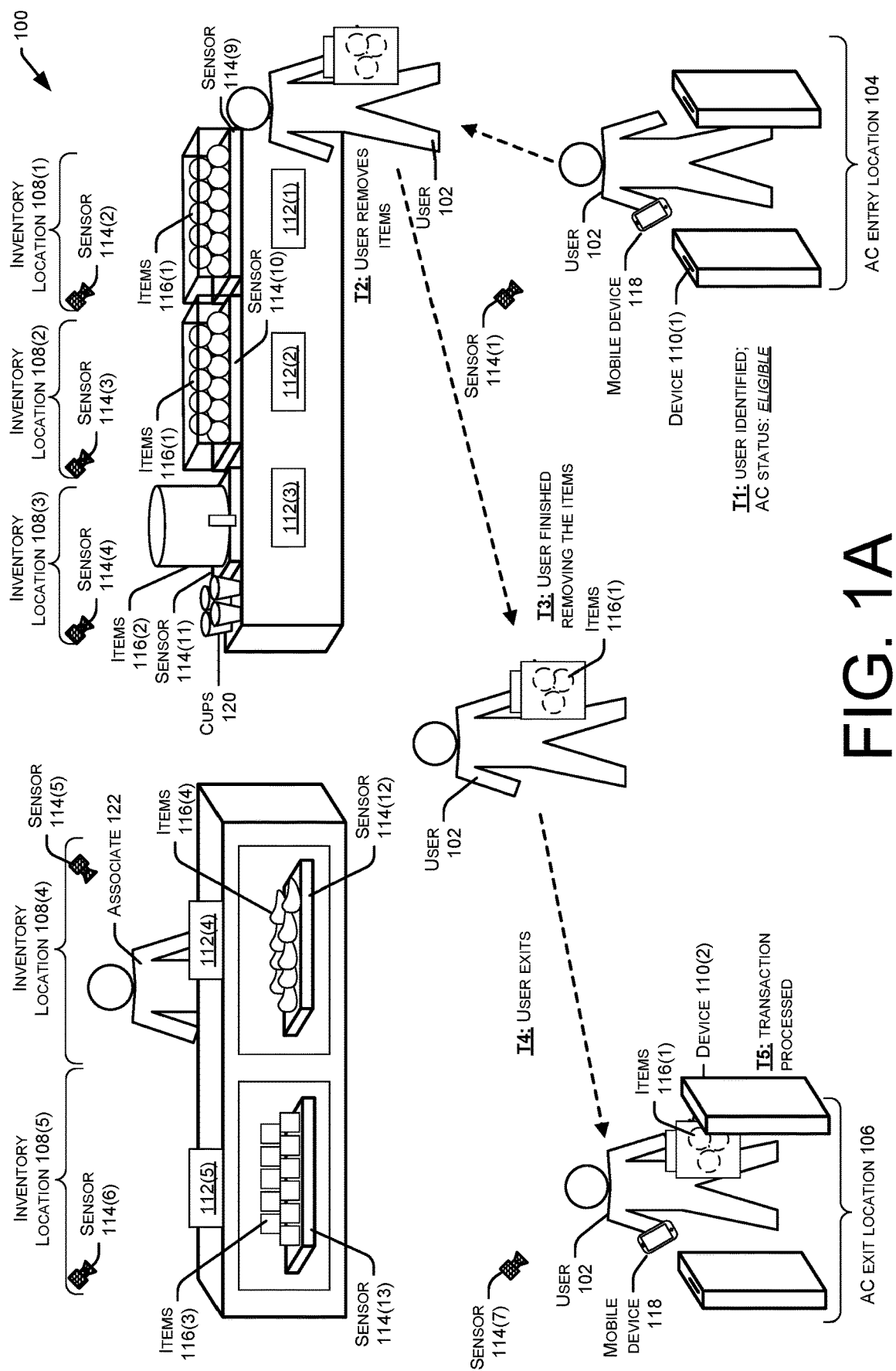
FIG. 1A illustrates an example facility associated with a system for enabling automated checkout (AC) techniques to allow users to enter the facility, remove items that are priced per unit weight, and exit the facility without performing a manual checkout of the items. In the example of FIG. 1A, the user removes items from inventory locations that include weight sensors for detecting the weight of the items removed.

This disclosure describes, in part, systems for enabling facilities (e.g., physical retail stores) with items that are priced per unit weight in order to implement automated-checkout (AC) techniques for customers of the facilities. For example, the described systems may enable the facilities to implement technology where users are able to pick items from inventory locations (e.g., shelves, racks, cases, cabinets, bins, floor locations, etc.) and exit the facility without performing manual checkout of the items. In some instances, the price of one or more items may be based on the total weight of the one or more items (e.g., price per unit weight items). For example, the price of fruit, such as oranges, may be based on the total weight of the oranges that the user picks from the inventory location (e.g., dollars per pound). The described systems may enable the facilities to implement technology in order to determine the prices of such items such that the users are still able to exit the facilities without having to specifically weight the items using scales that are separate from the inventory locations at which the items are located and/or without performing manual checkouts.

More specifically, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associate of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or, the entry location may include a microphone, camera, or other sensor that generates sensor information at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or, the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location or a separate identification station within the facility. Still, in some examples, the user may not order items, but may still provide information for identifying the user at a kiosk and/or other device. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then the system associated with the facility may generate a record indicating the presence of the user at the facility. The record may store an indication of the identity of the user, as well as an indication of whether the user is currently eligible to exit the facility (with items procured by the user) via the AC exit location.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of the user within the facility. Further, this sensor data (e.g., image data) may be used to locate the user as the user navigates through the store. Further, if the user interacts within one or more items housed at an inventory location, and/or orders an item that is priced per unit weight, the system may generate data indicative of the event. This data may comprise order data, indicating a result of the order of the customizable item or the interaction between the user and items that are priced per unit weight. In some instances, this order data indicates an action taken (e.g., an order, a confirmation of an order, a pick of an item, a return of an item, etc.), a description or identity of the item acted upon (e.g., a latte, a bottle of ketchup, a pair of jeans, pieces of fruit, etc.), a quantity, weight, and/or size of the item involved, a location of the item (e.g., meat counter, aisle, shelf, lane, etc.), a price of the item, and/or the like.

In some instances, and as described herein, the facility may include one or more inventory locations that allow users to purchase items that are priced based on the total weights of the items. These items may include, but are not limited to, produce, food bar items, bulk food items, pre-portioned items, meat counter, and/or any other items. For a first example, a user may remove fruit, such as oranges, from an inventory location, where the fruit is priced per unit weight. For a second example, a user may request a specific quantity and/or weight of meat, such as steak, from an associate of the facility, where the meat is price per unit weight.

The inventory locations may include weight sensors (e.g., scales) that are used to determine the total weights of the items removed from the inventory locations. For example, the weight sensors may include Legal for Trade (LFT) certified scales. The inventory locations may further include one or more displays that provide information to the users that are removing the items from the inventory locations. The information may include, but is not limited to, identity (ies) of item(s) being removed from the inventory locations, the price per unit weight of the item(s), the total weight of the item(s), the total price of the item(s), and/or the like.

For example, and to acquire such items, an electronic device (and/or the system) may determine an initial weight of the items located at the inventory location. For instance, the weight sensor located within the inventory location may determine the initial weight and then send data to the electronic device that represents the initial weight. A user may then approach the inventory location and begin removing one or more of the items from the inventory location. In some instances, the system may identify that the user is positioned at the inventory location. For a first example, the system may analyze sensor data to determine that the sensor data represents the user positioned at the inventory location (e.g., determine that image data represents image(s) depicting the user positioned at the inventory location). For a second example, the electronic device may receive input from the user that identifies the user. The electronic device may then send, to the system, data representing the identity of the user.

In some instances, the electronic device may determine that the user is removing the items(s). For example, the inventory location may include additional sensors that detect when a portion of the user (e.g., the hand of the user) is located over a vertical space of the inventory location. The sensors may continue to detect the portion of the user as the user continues to search through the items to select one or more of the items for removal. At the same time, the electronic device may detect that an event is occurring with regard to the inventory location. For example, the electronic device may determine that the user is removing items from and/or returning items to the inventory location.

As the user is removing the one or more items, the electronic device may determine the change in weight (e.g., the decrease in the amount of weight) via the weight sensor. In some instances, the electronic device continuously receives data from the weight sensor that indicates the current weight. In some instances, the electronic device receives the data from the weight sensor each time there is a change in the weight. In some instances, the electronic device receives the data from the weight sensor at given time intervals (e.g., every second, two seconds, five seconds, etc.). Still, in some instances, the electronic device receives the data from the weight sensor after the electronic device determines that the portion of the user is no longer located over the vertical space of the inventory location (e.g., either by using one or more sensors located at the inventory location and/or by receiving an indication from the system).

In any of these instances, the electronic device may cause the display to present the weight of the one more items removed from the inventory location (e.g., the change in weight). Additionally, the electronic device may cause the display to present the total price of the one or more items, which is based at least in part on the change in weight and the price per unit weight of the items.

The electronic device may perform similar processes if the user returns one or more of the items to the inventory location. For example, the user may be searching through the items located at the inventory location to select the best quality items. While searching, the user may be removing items, analyzing the items, keeping the items that the user likes, and then returning the items that user does not like. As such, the electronic device may continue to determine the change in the weight as the user is removing and returning items. Additionally, the electronic device may continue to update the display (e.g., the weight, the total price, etc.) for the user.

The electronic device may perform these processes until the electronic device determines that the user is finished. In some instances, the electronic device determines that the user is finished based on the weight sensor not detecting a change in weight for a threshold period of time. As described herein, a threshold period of time may include, but is not limited to, five seconds, ten seconds, fifteen seconds, and/or any other period of time. In some instances, the electronic device determines that the user is finished based on detecting that the portion of the user is no longer located in the vertical space of the inventory location. Still, in some instances, the electronic device may determine that the user is finished based on receiving data from the system. For instance, the system may analyze sensor data to determine that the user is no longer removing items from the inventory location and/or determine that the user is no longer positioned at the inventory location. The system may then send the data to the electronic device that indicates that the user is finished.

After determining that the user is finished, the electronic device may send data to the system, where the data represents an event associated with the interaction with the user. For instance, the data may represent an identity of the user, identity(ies) of item(s) removed from the inventory location, the weight of the item(s) removed, the price per unit weight of the item(s), the price of the item(s), and/or the like. The system may receive the data from the electronic device and associate the event with the account of the user. In some instances, before associating the event with the account of the user, the system confirms that the event is actually associated with the user.

In some instances, to perform the confirmation, the system may analyze sensor data representing an area around the inventory location to determine that the user was positioned around the inventory location at the time of the event. In some examples, the system determines that the user was "positioned around" the inventory location based at least in part on the user being located within a threshold distance to the inventory location at the time of the event. In some examples, the system determines that the user was positioned around the inventory location "at the time of the event" based at least in part on the user being located within the threshold distance to the inventory location within a threshold period of time to the time of the event. As described herein, the threshold period of time may include, but is not limited to, one second, five seconds, ten second, and/or any other time period.

In some instance, before associating the event with the account of the user, the system may determine that the user plans to remove the item(s) from the facility. In other words, the system may determine that the user has not returned the item(s) back to the inventory location (and/or another inventory location). In some instances, to make the determination, the system may analyze sensor data to determine that the user is in possession of the item(s) after leaving an area of the facility for which the inventory location of the item(s) is located. As described herein, the area may include, but is not limited to, an aisle, a lane, a section, and/or the like of the facility. In some instances, to make the determination, the system may analyze sensor data to determine that the user places the item(s) in a tote, a bag, and/or the like that is used to remove items from the facility. Still, in some instances, to make the determination, the system may analyze sensor data to determine that the user is still in possession of the item(s) while exiting the facility.

Although the above examples describe a user removing and/or returning item(s) from a single inventory location, in other examples, the user may remove and/or return item(s) from more than one inventory location. For instance, two inventory locations, located next to one another, may include the same type of items, such as oranges. In such instances, the user may remove items from both inventory locations, as well as return items removed from one inventory location to the other inventory location. In such instances, one or more techniques may be used to determine the total weight of the items removed from the inventory locations.

For a first example, the system may receive data from each of the electronic devices that are associated with the inventory locations, where the data represents at least the weight of the items removed from the respective inventory location and the price. The system may then determine the total weight from the weights removed from the inventory locations (e.g., add the weights to determine the total weight) and/or determine the total price from the prices determined by the electronic devices (e.g., add the prices to determine the total price). For a second example, the electronic devices may communicate with one another, such as by sending and/or receiving data representing the weights of the items removed from the inventory locations. At least one of the electronic devices may then determine the total weight and/or total price and send, to the system, data representing the total weight and/or total price.

Although the above examples describe the user as removing the item(s) from the inventory location, in other examples, an associate of the facility may remove the item(s) from the inventory location. For example, such as in an assisted shopping experience, the user may ask the associate for a given quantity of the item(s) and/or a given weight of the item(s). The associate may then remove the item(s) from the inventory location. In some instances, the system may perform similar processes as those described above (e.g., analyzing sensor data) to identify the item(s), determine the weight of the item(s), determine the price per unit weight of the item(s), determine the price of the item(s), and/or the like.

The system may further confirm that the item(s) are associated with the user. For a first example, the system may analyze sensor data to determine that the user is positioned at the inventory location and/or next to the associate at a time that the associate is removing the item(s) from the inventory location (e.g., at a time of the event). For a second example, the system may analyze sensor data to determine that the user is taking the item(s) from the associate and/or taking the item(s) from an area located proximate to the associate (e.g., from a counter). Still, for a third example, the system may receive data, such as from the electronic device associated with the inventory location, that represents an identity of the user. In any of the examples above, after confirming that the user is associated with the item(s), the system may associate the event with the account of the user.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-2B collectively illustrate an example facility 100 associated with a system for enabling automated checkout (AC) techniques to allow users, such as an example user 102, to enter the facility 100, order and/or pick one or more items, and exit the facility without performing a manual checkout of the items. To do so, the system coupled to the environment may identify the user 102 and charge an account associated with the user 102 for a cost of the ordered and/or picked items upon exit of the user 102.

As illustrated in FIGS. 1A-2B, the example facility 100 includes an AC entry location 104 and an AC exit location 106. The example facility 100 also includes inventory locations 108(1)-(5) (also referred to as "inventory locations 108"). In some examples, the facility 100 may also include devices 110(1)-(2) (also referred to as "devices 110"), which may include various types of scanning devices and/or electronic devices to help facilitate AC techniques, and devices 112(1)-(6) (also referred to as "devices 112"), which are associated with the inventory locations 108. The facility 100 may also include sensors 114(1)-(13) (also referred to as "sensors 114"). As suggested above, the sensors 114 may include cameras, microphones, weight sensors, and/or the like to help facilitate AC techniques. In general, the devices 110, the devices 112, and/or the sensors 114 may be associated with the AC entry locations 104, the AC exit locations 106, and/or the inventory locations 108. Various example AC scenarios will now be described with reference to the example facility 100 shown in FIGS. 1A-2B.

In the examples of FIGS. 1A-2B, the inventory locations 108 may be associated with devices 112 and sensors 114. For example, the inventory location 108(1) may include a sensor 114(9), such as a weight sensor, located within the inventory location 108(1), such as below items 116(1). The sensor 114(9) may be configured to determine the weight of the items 116(1) located at the inventory location 108(1). The inventory location 108(1) also includes a device 112(1). The device 112(1) may be configured to determine the weight using the sensor 114(9). In some instances, the device 112(1) continuously determines the weight using the sensor 114(9). In some instances, the device 112(1) determines the weight, using the sensor 114(9), at the elapse of time intervals. In some instances, the device 112(1) determines the weight, using the sensor 114(9), each time the weight changes. Still, in some instances, the device 112(1) determines the weight after detecting that users are no longer positioned above a vertical space of the inventory location 108(1).

The device 112(1) may then be configured to determine a change in the weight that is caused based on a user (e.g., the user 102) removing items 116(1) from and/or returning items 116(1) to the inventory location 108(1). Additionally, the device 112(1) is configured to determine a price for the items 116(1) removed based at least in part on the weight and the price per unit weight of the item 116(1) (e.g., the weight multiplied by the price per unit weight). The device 112(1) may then be configured to present the weight and the price to the users. This way, as the user is removing the items 116(1) from and/or returning the items 116(1) to the inventory location 108(1), the device 112(1) notifies the user about the weight and the price.

For example, and referring to FIG. 1A, the AC entry location 104 (e.g., entry gate) may request that entering users provide identifying information prior to entering the facility 100. In the illustrated example, the user 102 enters through the AC entry location 104 by scanning a unique code presented on a mobile device 118 of the user 102, such as at a scanning device 110(1) at the AC entry location 104. The scanning device 110(1) may provide this information to a system, such as an inventory management system discussed in following figures, which may use this information for identifying the entering user 102. Of course, while this example describes identifying the user 102 based at least in part on the user 102 scanning an unique code presented on the mobile device 118, the system may additionally, or alternatively, identify the user 102 based on voice data (e.g., the user 102 stating his or her name), image data (e.g., image data of a face of the user 102), password data (e.g., an alphanumeric string), credit card data, and/or any other type of data. For instance, the system may identify the user 102 based on data provided by sensor 114(1), or based on credit card data provided by device 110(1). In some examples, those users that have consented/requested to take part in the AC techniques may be identified, while the system may refrain from identifying other users entering the facility 100. As suggested above, in some examples a facility may not have specified entry locations or gates.

In the scenario illustrated in FIG. 1A, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user 102 upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument. In yet another example, the AC exit location 106 may include a device 110(2) configured to accept cash, such that the user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario of FIG. 1A, the device 112(1) may use the sensor 114(9) to determine an initial weight of the items 116(1) located at the inventory location 108(1). The device 112(1) may determine the initial weights between events that occur at the inventory location 108(1), where the events include users removing the items 116(1) from and/or returning the items 116(1) to the inventory location 108(1). The device 112(1) may then use the initial weight for a next event that occurs at the inventory location 108(1).

For example, and in the example of FIG. 1A, the user 102 enters the facility 100 and proceeds to the inventory location 108(1). As such, and at a second time ($T_2$), the user 102 removes a number of items 116(1) from the inventory location 108(1). For example, if the items 116(1) include oranges, the user 102 may proceed to the inventory location 108(1) and begin rummaging through the oranges in order to select oranges for purchase. While rummaging through the oranges, the user 102 may remove oranges from the inventory location 108(1) (e.g., in order to analyze the oranges), return oranges to the inventory location 108(1) (e.g., when the user does not like the oranges), and/or package the oranges for purchase (e.g., if the user likes the oranges).

The system may receive sensor data, such as image data generated by the sensor 114(2) located proximate to the inventory location 108(1). In some instances, the system may then analyze the sensor data to determine that the sensor data represents the user 102 positioned at the inventory location 108(1) and/or determine that the sensor data represents the user 102 removing items 116(1) from and/or returning items 116(1) to the inventory location 108(1). The system may further analyze the sensor data to determine a time associated with this event. For example, and using the example, above, the system may analyze the sensor data to determine that the user 102 is located proximate to the inventory location 108(1) that is associated with oranges. The system may also determine a time that the user 102 began rummaging through the oranges, a time that the user 102 finished rummaging through the oranges, and/or the period of time that the user 102 was rummaging through the oranges.

Figure 3A:
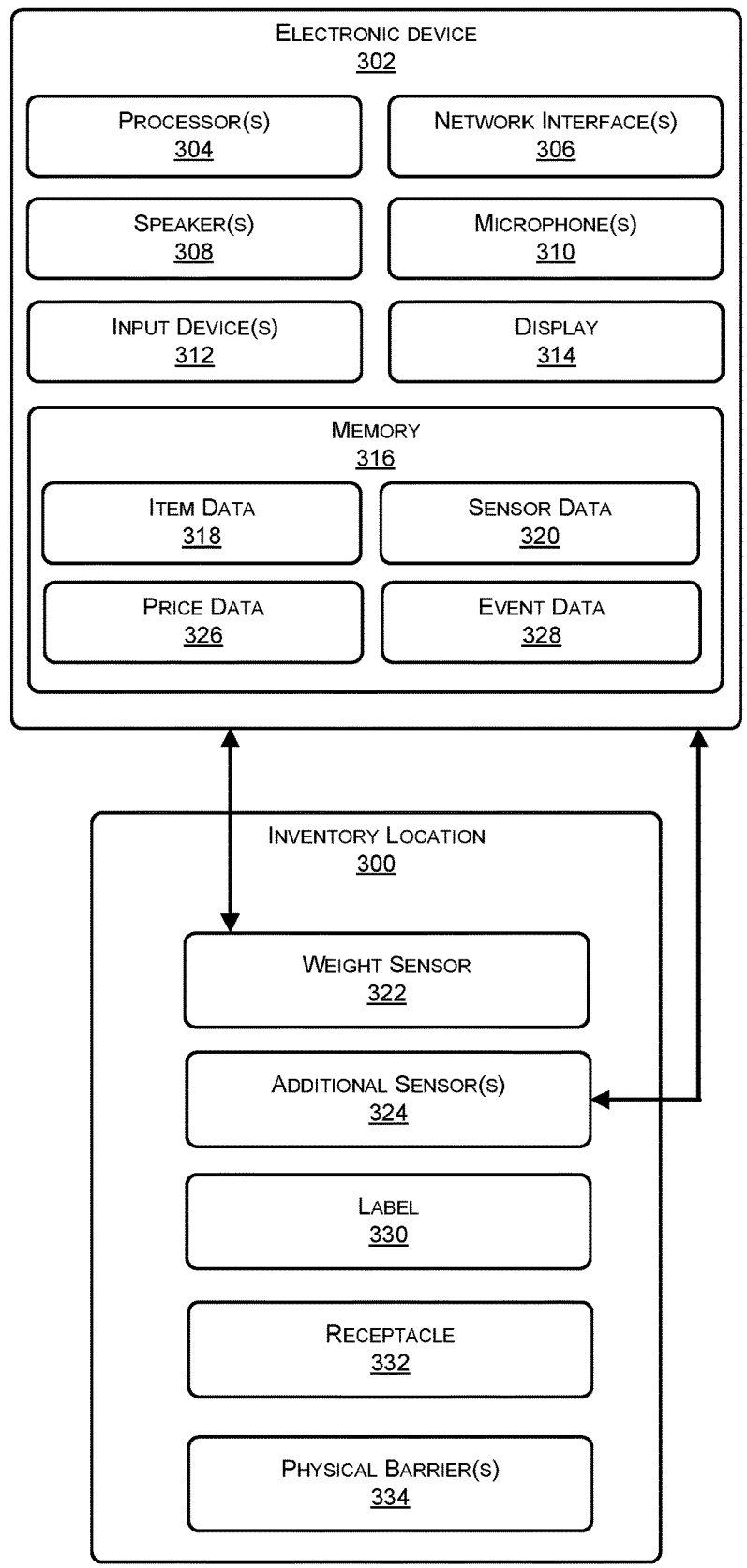
FIGS. 3A-3C collectively illustrate an example of an inventory location, as well as the components included at the inventory location.

Additionally, the device 112(1) may detect that a portion of the user 102 is located over a vertical space associated with the inventory location 108(1). This may indicate to the device 112(1) that a new event is occurring at the inventory location 108(1). In some instances, the device 112(1) may receive, from the system, an indication that the user 102 is located proximate to and/or over the vertical portion of the inventory location 108(1). In some instances, the device 112(1) may detect the portion of the user 102 using one or more sensors that are associated with the inventory location (e.g., as illustrated in FIG. 3A).

While the user 102 is removing the items 116(1) from and/or returning the items 116(1) to the inventory location 108(1), the device 112(1) may continue to determine the current weight of the remaining items 116(1) located at the inventory location 108(1). The device 112(1) may then determine the change in weight that is caused by the user 102 removing the items 116(1) from and/or returning the items 116(1) to the inventory location 108(1). For instance, the device 112(1) may determine the change in weight as the difference between the initial weight and the current weight. The device 112(1) may then display the change in weight (e.g., the weight of the items 116(1) removed) to the user 102. This way, as the user 102 is removing the items 116(1) from and/or returning the items 116(1) to the inventory location 108(1), the device 112(1) is able to notify the user 102 about the total weight of the items 116(1) removed.

The device 112(1) may also determine the price of the items 116(1) removed by the user 102 during the event. For a first example, the device 112(1) may store data indicating the price per unit weight of the items 116(1). The device 112(1) may then determine the price based at least in part on the change in weight and the price per unit weight. For a second example, the device 112(1) may send data to the system, where the data indicates the change in weight. The system may then determine the price based at least in part on the change in weight and the price per unit weight. Additionally, the system may send, to the device 112(1), data indicating the price. In either example, the device 112(1) may display the price to the user 102. This way, the user 102 is able to determine the price of the items 116(1) as the user 102 is removing the item 116(1) and/or returning the items 116(1) to the inventory location 108(1).

For example, and again using the example with the oranges described above, as the user is rummaging through the oranges, by removing oranges from and/or returning oranges to the inventory location 108(1), the device 112(1) may be receiving, from the sensor 114(9), sensor data indicating the current weight of the oranges remaining at the inventory location 108(1). The device 112(1) may then use the initial weight of the oranges, determined prior to the event, and the current weight to determine the weight of the oranges that were removed by the user 102. The device 112(1) may then display the weight of the oranges that were removed and the price of the oranges that is based on the weight and the price per unit weight of oranges.

Next, at a third time ($T_3$), the user 102 is finished removing the items 116(1) from the inventory location 108(1), which the device 112(1) may determine. In some instances, the device 112(1) may determine that the user 102 is finished based at least in part on determining that the weight of the items 116(1) remains constant for a threshold period of time. In some instances, the device 112(1) may determine that the user 102 is finished based at least in part on receiving input from the user 102, where the input indicates that the user 102 is finished. In some instances, the device 112(1) may determine that the user 102 is finished based at least in part on no longer detecting the portion of the user 102 located over the vertical space of the inventory location 108(1). Still, in some instances, the device 112(1) may determine that the user 102 is finished based at least in part on receiving, from the system, data indicating that the user 102 is finished.

In some instances, the system may determine that the user 102 is finished by analyzing sensor data to determine that the user 102 is no longer removing the items 116(1) from and/or returning the items 116(1) to the inventory location 108(1). In some instances, the system may determine that the user 102 is finished by analyzing sensor data to determine that the user 102 is no longer positioned at the inventory location 108(1). Still, in some instances, the system may determine that the user 102 is finished by analyzing sensor data to determine that another user is positioned at the inventory location 108(1), removing items 116(1) from the inventory location 108(1), and/or returning items 116(1) to the inventory location 108(1).

Based on determining that the user 102 is finished, the device 112(1) may send, to the system, data associated with the event. The data may represent at least a time of the event, the identity of the items 116(1) being removed from the inventory location 108(1), the price per unit weight of the items 116(1), the total weight of the items 116(1), the total price of the items 116(1), and/or the like. The system may then store data representing the event in association with the account of the user. For instance, the system may store data representing the time of the event, the identity of the items 116(1) being removed from the inventory location 108(1), the price per unit weight of the items 116(1), the total weight of the items 116(1), the total price of the items 116(1), and/or the like. Additionally, the device 112(1) may determine a new initial weight to use for the next event that occurs at the inventory location 108(1).

For example, and again using the example above with the oranges, the device 112(1) may determine that the user 102 is finished removing the oranges based on determining that the weight of the oranges remaining at the inventory location 108(1) has not changed for a threshold period of time and/or based on receiving, from the system, an indication that the user 102 is done. The device 112(1) may then determine the total weight of the oranges removed by the user 102. Additionally, the device 112(1) may determine the total price of the oranges that is based on the total weigh and the price per unit weight of oranges. Next, since the event is done, the device 112(1) may send, to the system, data indicating at least an identifier associated with oranges, a time at which the event started, a time at which the event ended, the total weight of the oranges, and the total price of the oranges. The system may then associate purchase of the oranges with the account of the user 102.

At a fourth time ($T_4$), in this example, the user 102 exits the facility 100 at the AC exit location 106 by, for example, providing identifying information, or by simply exiting the facility 100 without scanning or providing identifying information. For example, similar to the AC entry location 104, the AC exit location 106 (e.g., exit gate) may include a device 110(2) that enables the user 102 to scan a unique code from his or her mobile phone 118, or provide any other type of identifying information. In still other instances, the user 102 may walk out and the system may identify the user 102 via facial-recognition techniques using data from sensor 114(7), for example. In such instances, the user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 116(1) (e.g., the oranges) listed on the virtual cart of the user 102. The transaction processing may also include supplying a notification and/or receipt or other record of the transaction to the user 102, such as on their mobile device 118. Note that the facility also may offer the user 102 a selection of methods to pay upon exit. For instance, the user may be able to select, via the device 110(2), the mobile device 118, or another device, to pay with cash or another form of payment instead of the payment instrument that was selected by the system. The user 102 may make this selection at any time, including a time prior to exit from the facility.

It should be noted that, in the example of FIG. 1A, the user 102 may also remove items 116(1) from the inventory location 108(2) and/or items 116(2) from the inventory location 108(3). In such instances, similar techniques may be used to charge the user 102 for the items 116(1) removed from the inventory location 108(2) and/or the items 116(2) removed from the inventory location 108(3).

Additionally, in the example of FIG. 1A, the inventory location 108(1) includes the same type of items 116(1) as the inventory location 108(2). In some instances, if the user 102 removes both some of the items 116(1) from the inventory location 108(1) and additional of the items 116(1) from the inventory location 108(2), the system may determine a total weight of the items 116(1) removed from the combination of the inventory location 108(1) and the inventory location 108(2). The system may then store data representing the event in association with the account of the user. Again, the data may represent the time of the event, the identity of the items 116(1) being removed from the inventory locations 108(1)-(2), the price per unit weight of the items 116(1), the total weight of the items 116(1), the total price of the items 116(1), and/or the like.

For a first example, the system may receive, from the device 112(1), first data representing a first event that occurred at the inventory location 108(1). The first data may represent the time of the first event, the identity of the items 116(1) being removed from the inventory location 108(1), the price per unit weight of the items 116(1), a first weight of the items 116(1), a first price of the items 116(1), and/or the like. Additionally, the system may receive, from the device 112(2), second data representing a second event that occurred at the inventory location 108(2). The second data may represent the time of the second event, the identity of the items 116(1) being removed from the inventory location 108(2), the price per unit weight of the items 116(1), a second weight of the items 116(1), a second price of the items 116(1), and/or the like. The system may then determine the total weight based at least in part on the first weight and the second weight (e.g., add the first weight to the second weight) and/or a first total price based at least in part on the first price and the second price (e.g., add the first price and the second price).

For a second example, the device 112(1) may communicate with the device 112(2) while the user 102 is removing and/or returning the items 116(1). For example, the device 112(1) may receive, from the device 112(2), data representing at least the change in the weight of the items 116(1) located at the inventory location 108(2) and/or the price of the items 116(1) removed from the inventory location 108 (2). The device 112(1) may then determine a total weight of the items 116(1) removed based at least in part on the change of the weight at the inventory location 108(1) and the change of the weight at the inventory location 108(2). Additionally, the device 112(1) may determine the total price based at least in part on the total weight. The device 112(1) may then display the total weight and/or the total price to the user 102. Additionally, once the user 102 is finished, the device 112(1) may send, to the system, data representing the time of the event, the identity of the items 116(1), the price per unit weight of the items 116(1), the total weight of the items 116(1), the total price of the items 116(1), and/or the like.

Additionally, it should be noted that, in some instances, the user 102 may remove items 116(1) from the inventory location 108(1) and then return the same items 116(1) to the inventory location 108(2). However, since both of the inventory locations 108(1)-(2) include the same items 116(1), and since both of the inventory locations 108(1)-(2) are determining the weight of the items 116(1), the total weight and total price of the items 116(1) will still be correct (e.g., using the techniques described above).

As further illustrated in the example of FIG. 1A, the inventory location 108(3) may include a dispenser for liquid items 116(2). For instance, the user 102 may be able to remove a cup 120 and then empty a portion of the liquid into the cup 120. The system, the device 112(3), and/or the senor 114(11) may perform similar techniques, as those described above with respect to the items 116(1), to determine the weight of the liquid emptied from the inventory location 108(3) and the price of the items 116(2) that is based on the weight.

Figure 1B:
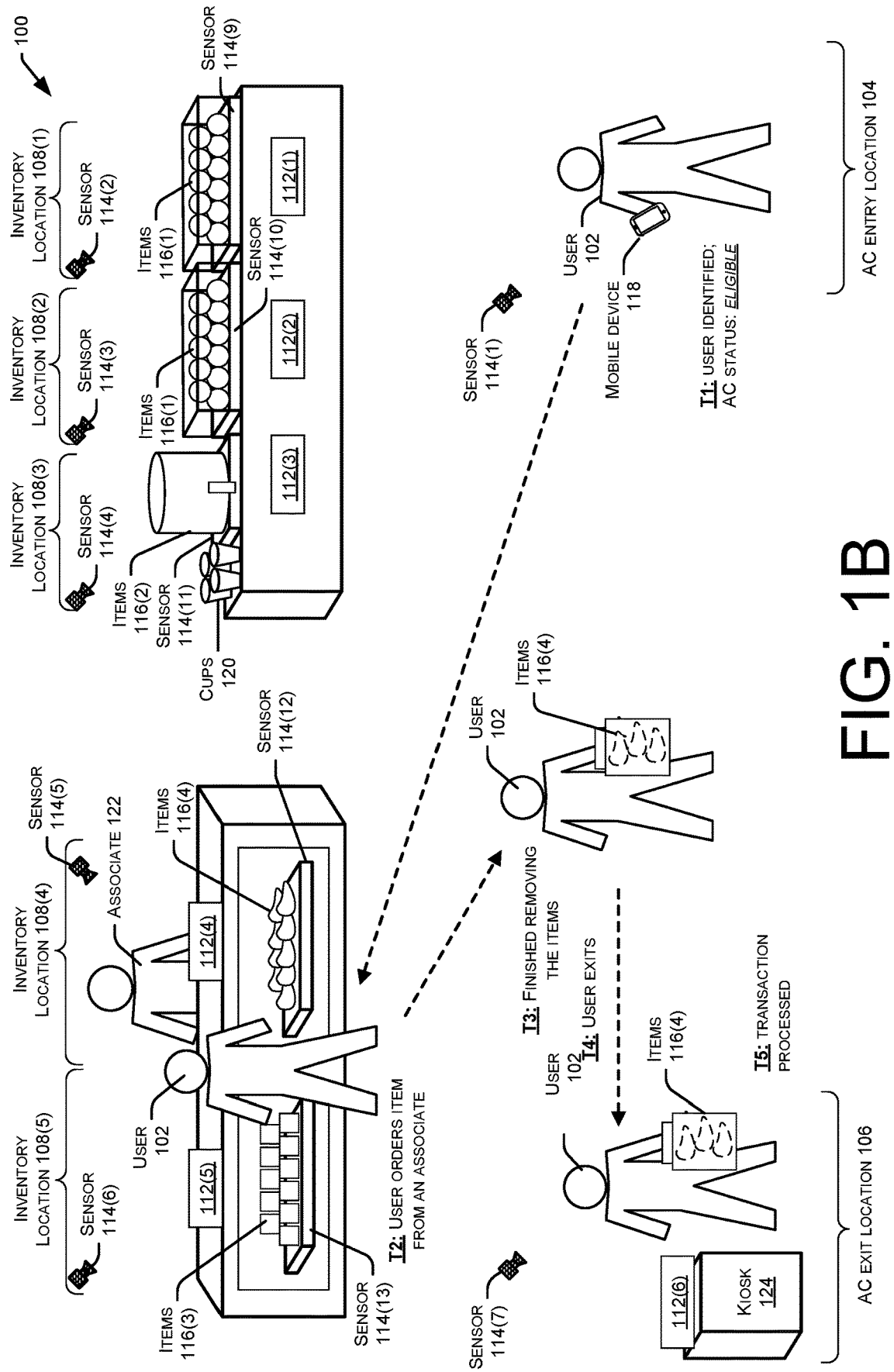
FIG. 1B illustrates the example facility associated with the system for enabling the AC techniques. In the example of FIG. 1B, an associate provides the user with an assisted shopping experience.

Now referring to FIG. 1B, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user 102 upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument.

Returning to the scenario of FIG. 1B, the device 112(4) may use the sensor 114(12) to determine an initial weight of the items 116(1) located at the inventory location 108(4). The device 112(4) may determine the initial weights between events that occur at the inventory location 108(4), where the events include users removing, via the associate 122, the items 116(1) from and/or returning the items 116(1) to the inventory location 108(4). The device 112(1) may then use the initial weight for a next event that occurs at the inventory location 108(4).

For example, and in the example of FIG. 1B, the user 102 enters the facility 100 and proceeds to the inventory location 108(4). As such, and at a second time ($T_2$), the user 102 may request a given quantity of the items 116(1) and/or a given weight of the items 116(1) from the associate 122 of the facility 100. For an example, if the inventory locations 108(4)-(5) are associated with a meat counter, the user 102 may order a quantity (e.g., three pieces) of meat (e.g., item 116(4)), such as steak, from the associate 122. The associate may remove the quantity of meat from the inventory location 108(4) and then package the meat for the user 102.

While the user 102 is interacting with the associate 122 and/or after the user 102 is finished interacting with the associate 122, the system may receive sensor data, such as image data generated by the sensor 114(5) located proximate to the inventory location 108(4). In some instances, the system may then analyze the sensor data to determine that the sensor data represents the user 102 positioned at the inventory location 108(4). Additionally, the system may analyze the sensor data to determine that the sensor data represents the associate 122 removing items 116(4) from and/or returning items 116(4) to the inventory location 108(4). The system may further analyze the sensor data to determine a time associated with this event.

In some instances, similar to the example of FIG. 1A, the device 112(4) may detect that a portion of the associate 122 is located over a vertical space associated with the inventory location 108(4). This may indicate to the device 112(4) that a new event is occurring at the inventory location 108(4).

While the associate 122 is removing the items 116(4) from and/or returning the items 116(4) to the inventory location 108(4), the device 112(4) may continue to determine the current weight of the remaining items 116(4) located at the inventory location 108(4). The device 112(4) may then determine the change in weight that is caused by the associate 122 removing the items 116(4) from and/or returning the items 116(4) to the inventory location 108(4), using similar processes as described above with respect to the device 112(1). Additionally, the device 112(4) may determine the price of the items 116(4) removed by the associate 122, using similar processes as those described above with respect to the device 112(1). Furthermore, the device 112(4) may display the weight and/or the price to the user 102.

Next, at a third time ($T_3$), the user 102 receives the items 116(4) from the associate 122 and is finished. For example, and using the example above, after packaging the meat for the user 102, the associate 122 may place the package on top of the inventory location 108(4) and/or give the package to the user 102. Additionally, the device 112(4) may determine that the associate 122 is finished removing the items 116(4) from the inventory location 108(4) (e.g., determine that the event associated with the user 102 is finished. In some instances, the device 112(4) may determine that the associate 122 is finished based at least in part on determining that the weight of the items 116(1) remains constant for a threshold period of time. In some instances, the device 112(4) may determine that the associate 122 is finished based at least in part on receiving input from the associate 122, where the input indicates that the associate 122 is finished. In some instances, the device 112(4) may determine that the associate 122 is finished based at least in part on determining that the portion of the associate 122 is no longer located within the vertical space of the inventory location 108(4). Still, in some instances, the device 112(4) may determine that the associate 122 is finished based at least in part on receiving, from the system, data indicating that the associate 122 is finished.

In some instances, the system may determine that the associate 122 is finished by analyzing sensor data to determine that the associate 122 is no longer removing the items 116(4) from and/or returning the items 116(4) to the inventory location 108(4). In some instances, the system may determine that the associate 122 is finished by analyzing sensor data to determine that the user 102 is no longer positioned at the inventory location 108(4). In some instances, the system may determine that the associate 122 is finished by analyze sensor data to determine that the user 102 received the items 116(4). Still, in some instances, the system may determine that the associate 122 is finished by analyzing sensor data to determine that another user is positioned at the inventory location 108(4) and/or requesting items from the associate 122.

As such, the device 112(4) may send, to the system, data associated with the event. The data may represent at least the time of the event (e.g., a start time of the event, an end time of the event, etc.), the identity of the items 116(4) being removed from the inventory location 108(4), the price per unit weight of the items 116(4), the weight of the items 116(4), the price of the items 116(4), and/or the like. The system may then store data representing the event in association with the account of the user 102. For instance, the system may store data representing the time of the event, the identity of the items 116(4), the price per unit weight of the items 116(4), the weight of the items 116(4), the price of the items 116(4), and/or the like. Additionally, the device 112(4) may determine a new initial weight to use for the next event that occurs at the inventory location 108(4).

At a fourth time ($T_4$), in this example, the user 102 exits the facility 100 at the AC exit location 106 by, for example, providing identifying information, or by simply exiting the facility 100 without scanning or providing identifying information. For instance, and as illustrated in the example of FIG. 1B, the user 102 may provide information using a kiosk 124 located at the AC exit location 106, by inputting the information into the device 112(6). For instance, the user may input, into the device 112(6), a name, an email address, a home address, and/or the like. The system may then receive the information from the device 112(6) and use the information to send a receipt to the user 102. For instance, the system may use the email address to email the receipt to the user 102.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 116(4) listed on the virtual cart of the user 102. The transaction processing may also include supplying a notification and/or receipt or other record of the transaction to the user 102, such as on their mobile device 118.

Figure 2A:
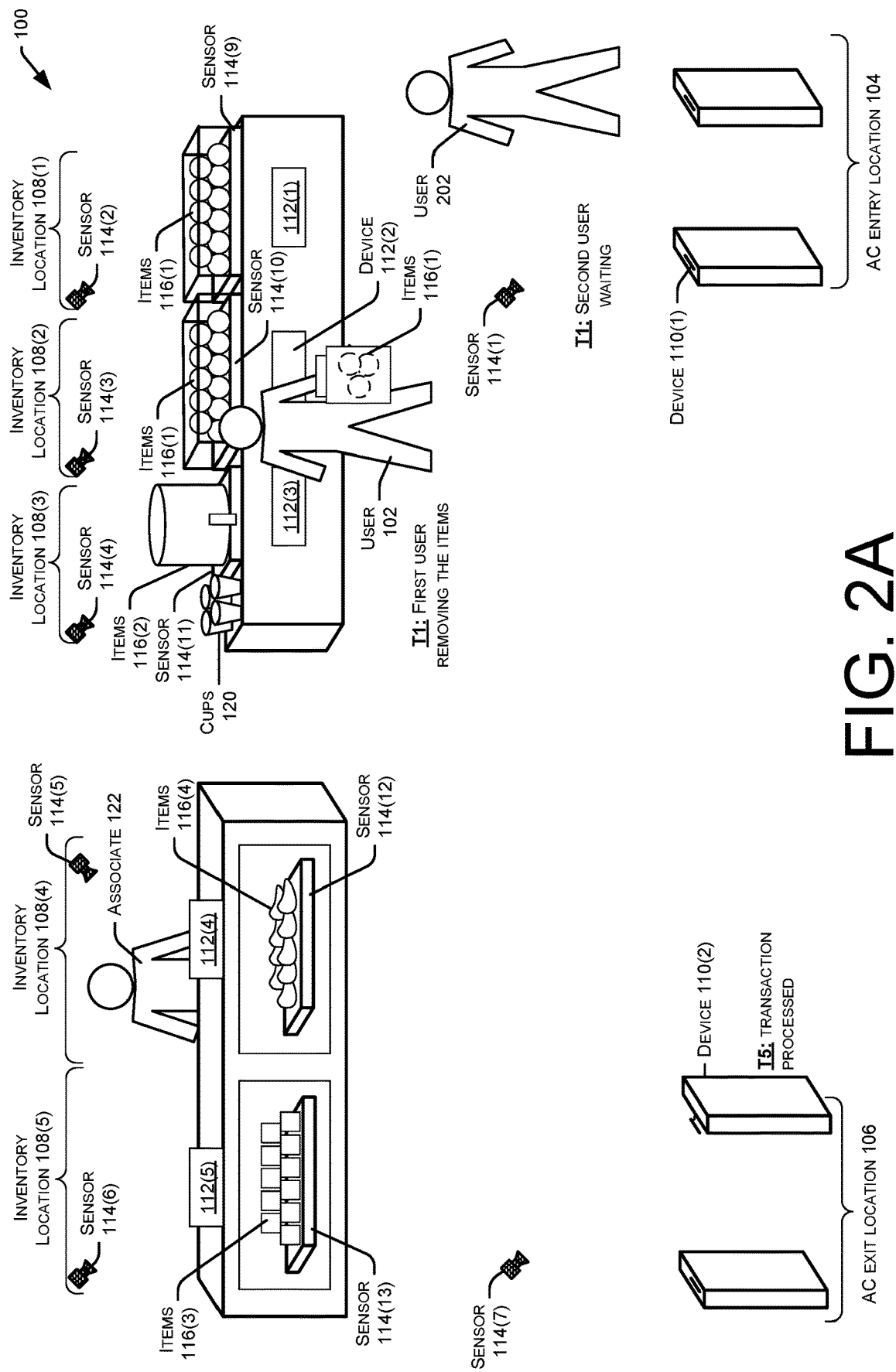
FIGS. 2A-2B collectively illustrate the example facility associated with the system for enabling the AC techniques. In the example of FIGS. 2A-2B, the system is able to determine that different users are removing items from an inventory location over a period of time.
Figure 2B:
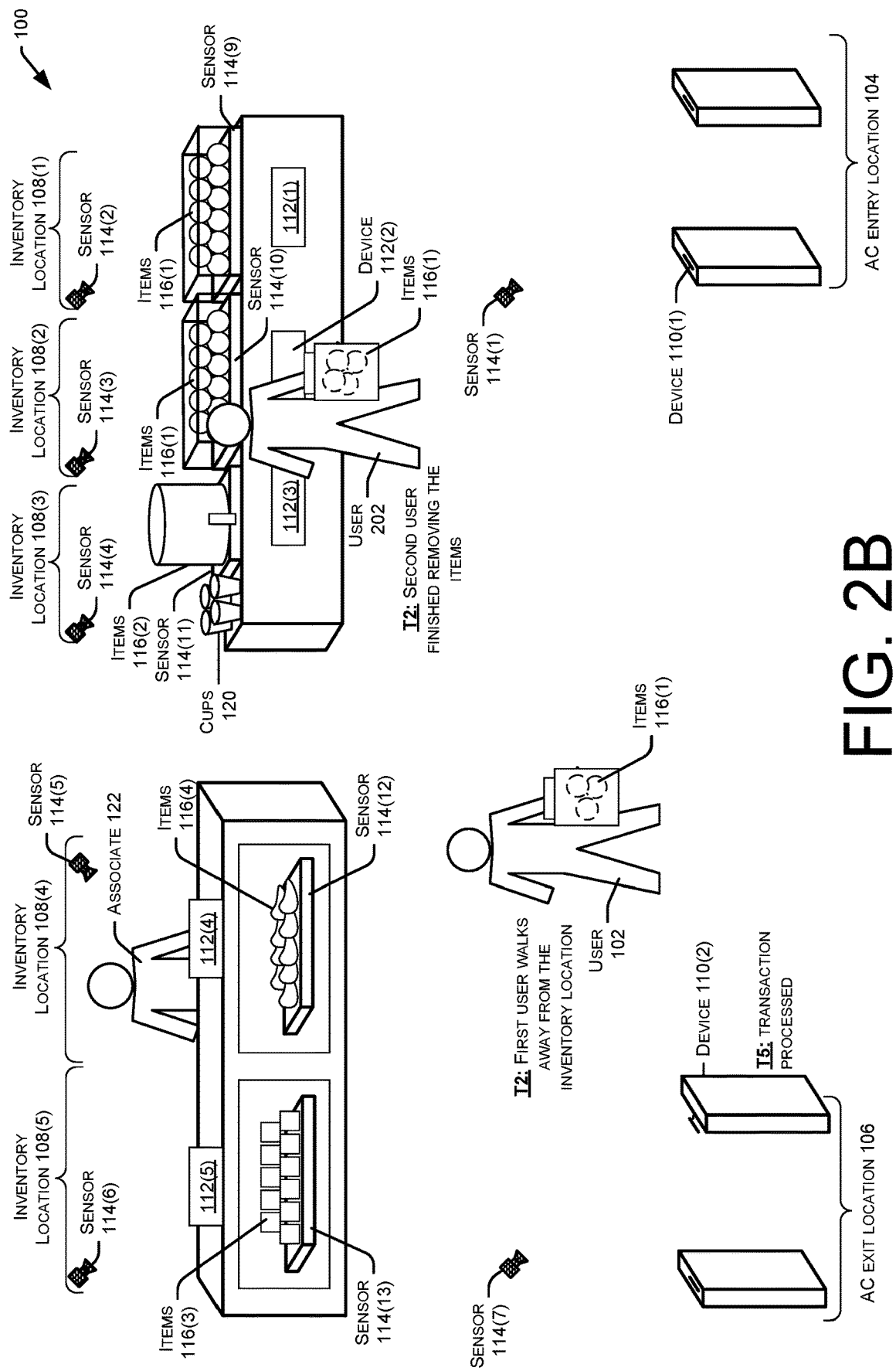

FIGS. 2A-2B collectively illustrate the example facility 100 associated with the system for enabling the AC techniques. In the example of FIGS. 2A-2B, the system is able to determine that different users are removing items from an inventory location over a period of time. More specifically, in the example of FIG. 2A, and at a first time ($T_1$), the user 102 may be removing items 116(1) from the inventory location 108(2). As such, the device 112(2) may determine, using the sensor 114(10), the weight of the items 116(1) removed from the inventory location 108(2) and the price of the items 116(1) that is based at least in part on the weight. The device 112(2) may then display at least the weight and the price to the user 102.

As further illustrated in FIG. 2A, at the first time ($T_1$), another user 202 may be waiting for the user 102 to finish removing the items 116(1) from the inventory location 108(2). As shown, the user 202 may be located at an area that is located proximate to the inventory location 108(2). As such, the system may determine that the user 102 is removing the items 116(1) from the inventory location 108(2) and not the user 202.

For a first example, the system may analyze sensor data, such as image data generated by the sensor 114(3), to determine that the user 102 is positioned at the inventory location 108(1). Based at least in part on the determination, the system may determine that the user 102 is removing the items 116(1). For a second example, the system may analyze sensor data, such as image data generated by the sensor 114(3), to determine that the user 102 is actually removing the items 116(1). Still, for a third example, the system may analyze sensor data, such as image data generated by the sensor 114(3), to determine that the user 102 is located closer to the inventory location 108(1) than the user 202. Based at least in part on the determination, the system may determine that the user 102 is removing the items 116(1).

In any of the examples above, the system and/or the device 112(2) may perform one or more of the techniques described herein to determine that the event associated with the user 102 is finished. As such, the device 112(2) may send, to the system, data representing the time of the event, the identity of the items 116(1) being removed from the inventory location 108(2), the price per unit weight of the items 116(1), the weight of the items 116(1), the price of the items 116(1), and/or the like. The system may then store data representing the event in association with the account of the user 102. The data may represent the time of the event, the identity of the items 116(1) being removed from the inventory location 108(2), the price per unit weight of the items 116(1), the weight of the items 116(1), the price of the items 116(1), and/or the like.

Since the device 112(2) determined that the event is finished, the device 112(2) may determine a new initial weight of the remaining items 116(1) at the inventory location 108(1). The device 112(1) may then use the new initial weight for the next event that occurs at the inventory location 108(2). For example, and as illustrated in FIG. 2B, at a second time ($T_2$), the user 102 may walk away from the inventory location 108(2). The user 202 may the approach the inventory location 108(2) and begin removing items 116(1) from the inventory location 108(2). When the user 202 is finished removing the items 116(1), the device 112(2) may determine a final weight of the items 116(1) remaining at the inventory location 108(2).

The device 112(2) may then determine a price of the items 116(1) removed by the user 202 based on at least the initial weight, determined after the event associated with the user 102, and the final weight. Using the weight, the device 112(2) may determine a price of the items 116(1) and display the weight and the price to the user 202. Additionally, the device 112(2) may send, to the system, data representing the time of the event, the identity of the items 116(1) being removed from the inventory location 108(2), the price per unit weight of the items 116(1), the weight of the items 116(1), the price of the items 116(1), and/or the like. The system may then store data representing the event in association with the account of the user 202. The data may represent the time of the event, the identity of the items 116(1) being removed from the inventory location 108(2), the price per unit weight of the items 116(1), the weight of the items 116(1), the price of the items 116(1), and/or the like.

Figure 3B:
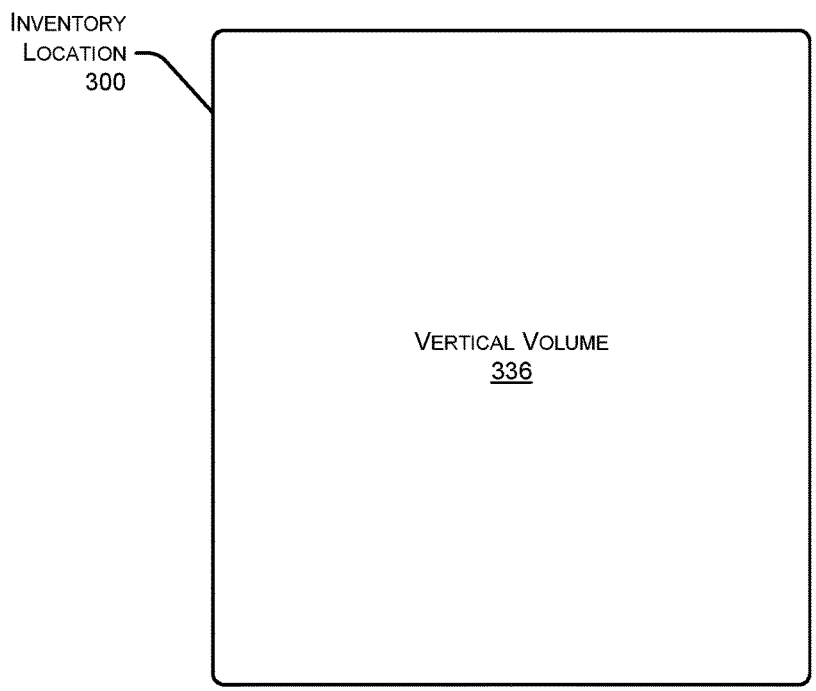
Figure 3C:
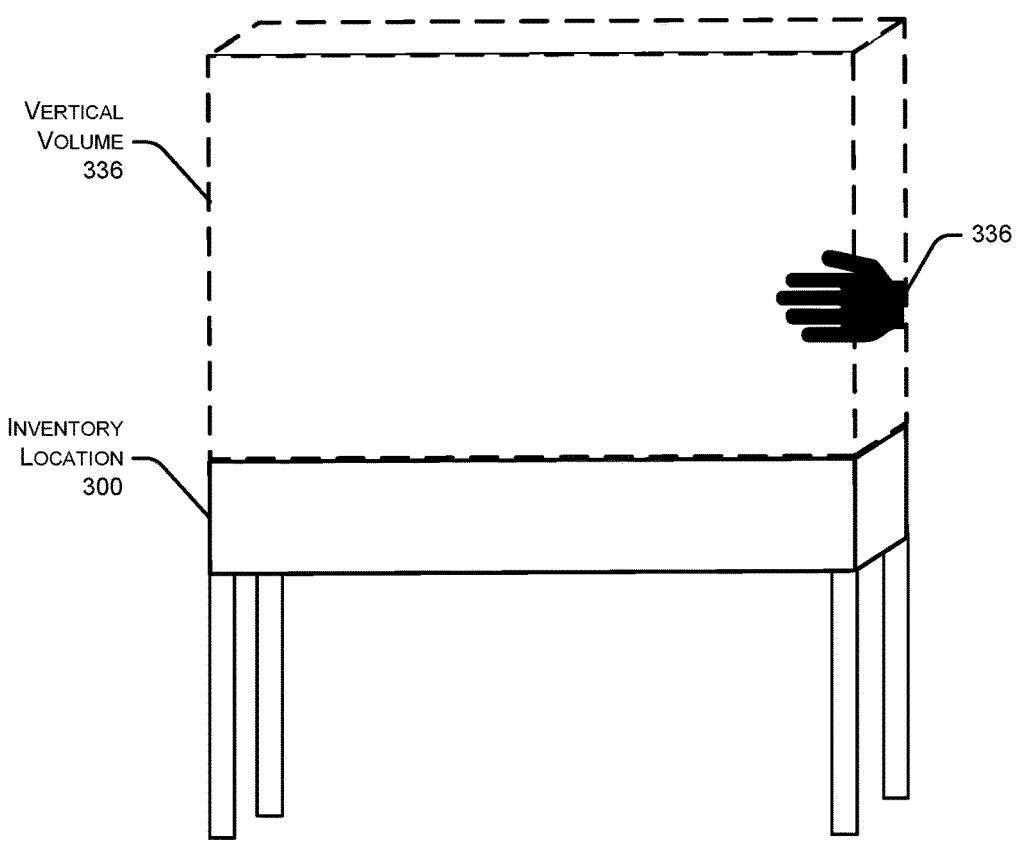

FIGS. 3A-3C collectively illustrate an example of an inventory location 300 (which may represent, and/or include, one of the inventory locations 108), as well as the components included at the inventory location 300. As shown, an electronic device 302 includes processor(s) 304, network interface(s) 306, speaker(s) 308, microphone(s) 310, input device(s) 312, a display 314, and memory 316. In some instances, the electronic device 302 may include one or more additional components not illustrated in the example of FIG. 3A. In some instances, the electronic device 302 may not include one or more of the speaker(s) 308, the microphone(s) 310, the input device(s) 312, or the display 314.

The input device(s) 312 may include button(s), key(s), joystick(s), touch-sensitive pad(s), trigger(s), sensor(s) that detect movement of the electronic device 302 (e.g., accelerometer(s), magnetometer(s), etc.), touch inputs to the display 314, and/or any other type of device that is able to receive input from the user.

The electronic device 302 may include memory 316. The memory 316 may be used to store any number of software components that are executable by the processor(s) 304. As shown, the memory 316 may store item data 318. The item data 318 may represent the identities of items that are associated with the inventory location 300 (e.g., located at the inventory location 300). As described herein, an identity may include, but is not limited to, a name, a classifier, an identifier (e.g., a numerical identifier, an alphabetic identifier, a mixed numerical and alphabetic identifier, etc.), and/or the like that identifies an item. In some instances, the electronic device 302 receives the item data 318 from the system. In some instances, the electronic device 302 receives the item data 318 at a time at which a user is positioned near the electronic device 302. Still, in some instances, the electronic device 302 receives the item data 318 based on sending a request to the system.

The memory 316 may further be used to store sensor data 320 generated by a weight sensor 322 and/or one or more additional sensors 324. The sensor data 320 generated by the weight sensor 322 may represent the weight of one or more items that located at the inventory location 300. In some instances, the electronic device 302 receives the sensor data 320 at given time intervals (e.g., every second, every five seconds, every minute, and/or the like). In some instances, the electronic device 302 receives the sensor data 320 each time the weight sensor detects a change in weight. In some instances, the electronic device 302 receives the sensor data 320 based on requesting the sensor data 320 from the weight sensor 322. Still, in some instances, the electronic device 302 receives the sensor data 320 from the weight sensor 322 after determining, using sensor data 320 generated by the additional sensor(s) 324, that a portion of a user is no longer located in a vertical space above the inventory location 300.

In some instances, the memory 316 may be used to store price data 326 associated with items. The price data 326 associated with an item may represent the price per unit weight associated with the item. For example, the price data 326 associated with a type of fruit may indicate that the fruit is $1.50 per pound. In some instances, the electronic device 302 receives the price data 326 from the system. In some instances, the electronic device 302 receives the price data 326 at a time at which a user is poisoned near the electronic device 302. Still, in some instances, the electronic device 302 receives the price data 326 based on sending a request to the system, such as when a user is weighing items.

As further illustrated in the example of FIG. 3A, the memory 316 may be used to store event data 328. The event data 328 may represent events that occur at the inventory location 300. For example, the event data 328 associated with an event may represent at least an identity of a user, a time of the event, identity(ies) associated with item(s), a weight of the item(s), a price per unit weight associated with the item(s), a price of the item(s), and/or the like. In some instances, the electronic device 302 may store the event data 328 for a given period of time (e.g., one hour, ten hours, one day, etc.). In some instances, the electronic device 302 may store the event data 328 until the electronic device 302 sends the event data 328 to the system.

In some instances, the weight sensor 322 may include a LFT commercial scale, which is tested and verified to meet national standards and/or local regulations. For instance, the National Type Evaluation Program (NTEP) may have evaluated the weight sensor 322 and issued a Certification of Conformance (CC) for the weight sensor 322. In some instances, the weight sensor 322 may include at least a top platter and base.

As further illustrated in the example of FIG. 3A, the inventory location 300 may include a label 330, a receptacle 332, and physical barrier(s) 334. The label 330 may include information about the items included at the inventory location. For example, the label 330 may indicate the identity (ies) of the items, the price per unit weight of the items, and/or other information. The receptacle 332 may include, but is not limited to, a container, a bin, and/or any other type of receptacle that is capable of containing the items.

The physical barrier(s) 334 may include one or more physical objects that restrict how users are to remove items from the inventory location 300. For example, the physical barrier(s) 334 may include walls around three of the four sides of the inventory location 300 such that users are only able to access the items using one side of the inventory location 300. In some instances, the physical barrier(s) 334 are used in order to limit the number of users that are able to take items from the inventory location 300 at a single instance. For instance, the physical barrier(s) 334 may limit the number of users to a single user.

Although the example of FIG. 3A illustrates the weight sensor 322 and/or the additional sensor(s) 324 being separate from the electronic device 300, in other examples, the electronic device 300 may include the weight sensor 322 and/or the additional sensor(s) 324.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s) may enable messages between devices, such as the electronic device 302, the weight sensor 322, and the system, as well as other networked devices. The network interface(s) may include one or more network interface controllers (NICs) or other types of transceiver devices to send and receive messages over network(s). For instance, each of the network interface(s) may include a personal area network (PAN) component to enable messages over one or more short-range wireless message channels. For instance, the PAN component may enable messages compliant with at least one of the following standards IEEE 902.15.4 (ZigBee), IEEE 902.15.1 (Bluetooth), IEEE 902.11 (WiFi), or any other PAN message protocol. Furthermore, each of the network interface(s) may include a wide area network (WAN) component to enable message over a wide area network.

As shown in the examples of FIGS. 3B-3C, the inventory location 300 may be associated with a vertical volume 336 that is located above the inventory location 300. In some instances, the vertical volume 336 is located above the receptacle 332 of the inventory location 300, where the items are located on and/or within the receptacle 332. The additional sensor(s) 324 may be used to determine when a portion of a user is located within the vertical volume 336. For example, the additional sensor(s) 324 may be configured to detect when a hand 336 of a user enters the vertical volume 336, as illustrated in the example of FIG. 3C, and when the hand 336 of the user exits the vertical volume 336.

FIGS. 4A-7 illustrate various processes for implementing AC techniques for customers of facilities. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 4A:
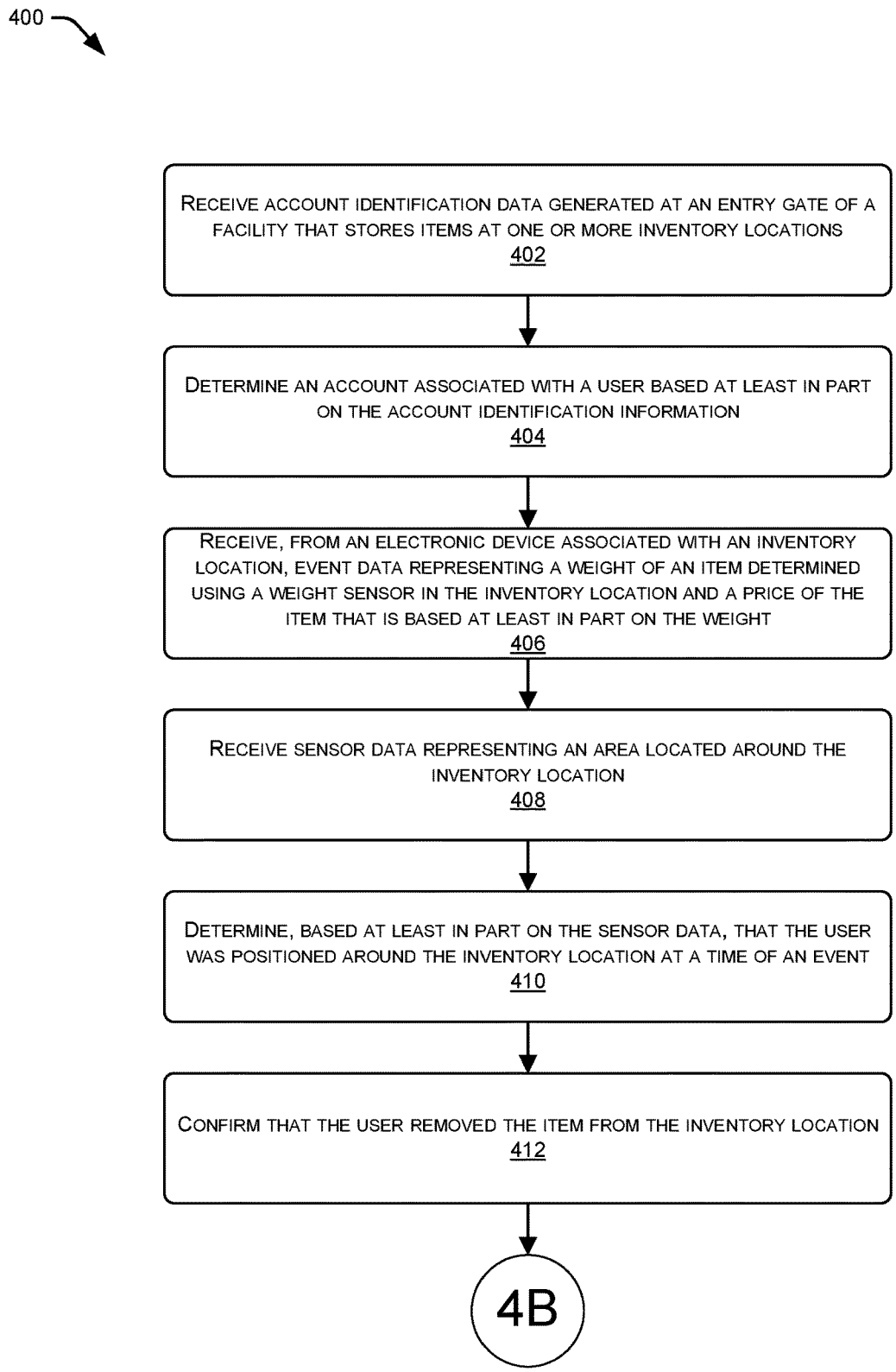
FIGS. 4A-4B are an example process for determining that an order is associated with a user and then processing a transaction associated with the order.
Figure 4B:
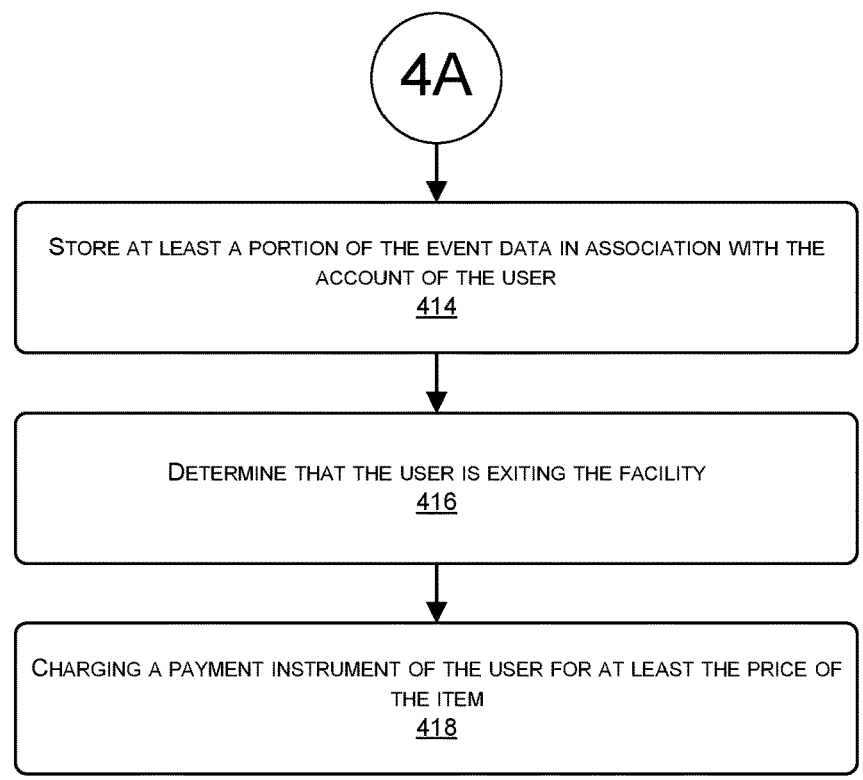

FIGS. 4A-4B are an example process 400 for determining that an event is associated with a user and then processing a transaction associated with the event. At 402, the process 400 may include receiving account identification data scanned at an entry gate of a facility that stores items at one or more inventory location. For instance, a system may receive sensor data from one or more sensors located at the entry gate of the facility, where the sensor data represents the account identification data. In some examples, the account identification data includes a unique code and/or other identifier scanned from a mobile phone of the user. In some examples, the account identification data includes image data representing at least a portion of the user (e.g., image data representing the face of the user, image data representing the palm of the hand of the user, etc.). While these are just a couple of examples of account identification data, in other examples, the account identification data may include any type of data that identifies an account of the user.

At 404, the process 400 may include determining an account associated with a user based at least in part on the account identification information. For instance, the system may match the account identification data to stored account identification data that is associated with an account. Based at least in part on the match, the system may identify the account of the user. In some instances, the system then generates a record for the user located at the facility.

At 406, the process 400 may include receiving, from an electronic device associated with an inventory location, event data representing a weight of an item determined using a weight sensor in the inventory location and a price of the item that is based at least in part on the weight. For instance, the system may receive the event data from the electronic device. The event data may indicate the change in weight of the items located at the inventory location, where the change in weight is detected by the weight sensor. In some instances, the weight sensor is located beneath the items. The event data may further indicate the price of the item as determined by the electronic device using the weight. In some instances, the event data may further indicate the identity of the user that removed the item and/or a time at which the event occurred.

At 408, the process 400 may include receiving sensor data representing an area located around the inventory location and at 410, the process 400 may include determining, based at least in part on the sensor data, that the user was positioned around the inventory location at a time of an event. For instance, the system may receive the sensor data from one or more sensors, such as one or more cameras, where the sensor data was generated at the time of the event. The system may then analyze the sensor data to determine that the sensor data represents the user positioned around the inventory location. For example, if the sensor data includes image data, the system may analyze the image data to determine that at least an image represented by the image data depicts the user positioned around the inventory location.

At 412, the process 400 may include confirming that the user removed the item from the inventory location. For instance, based at least in part on the user being positioned around the inventory location at the time of the event, the system may confirm that the user removed the item from the inventory location. In some instances, the system may use one or more additional and/or alternative techniques to confirm that the user removed the item.

At 414, the process 400 may include storing at least a portion of the event data in association with the account of the user. For instance, after confirming that the user removed the item, the system may store the at least the portion of the event data in association with the account. In some instances, prior to storing the at least the portion of the event data and/or after storing the at least the portion of the event data, the system may confirm that the user is removing the item from the facility. For example, the system may analyze sensor data to determine that the user did not return the item to the inventory location (and/or another inventory location) and/or exited the facility with the item.

At 416, the process 400 may include determining that the user is exiting the facility and at 418, the process 400 may include charging a payment instrument of the user for at least the price of the item. For instance, the system may receive sensor data indicating that the user is exiting the facility. Based at least in part on the user exiting the facility, the system may charge the payment instrument of the user for the price of the item. In some instances, the payment information is associated with the account of the user.

Figure 5:
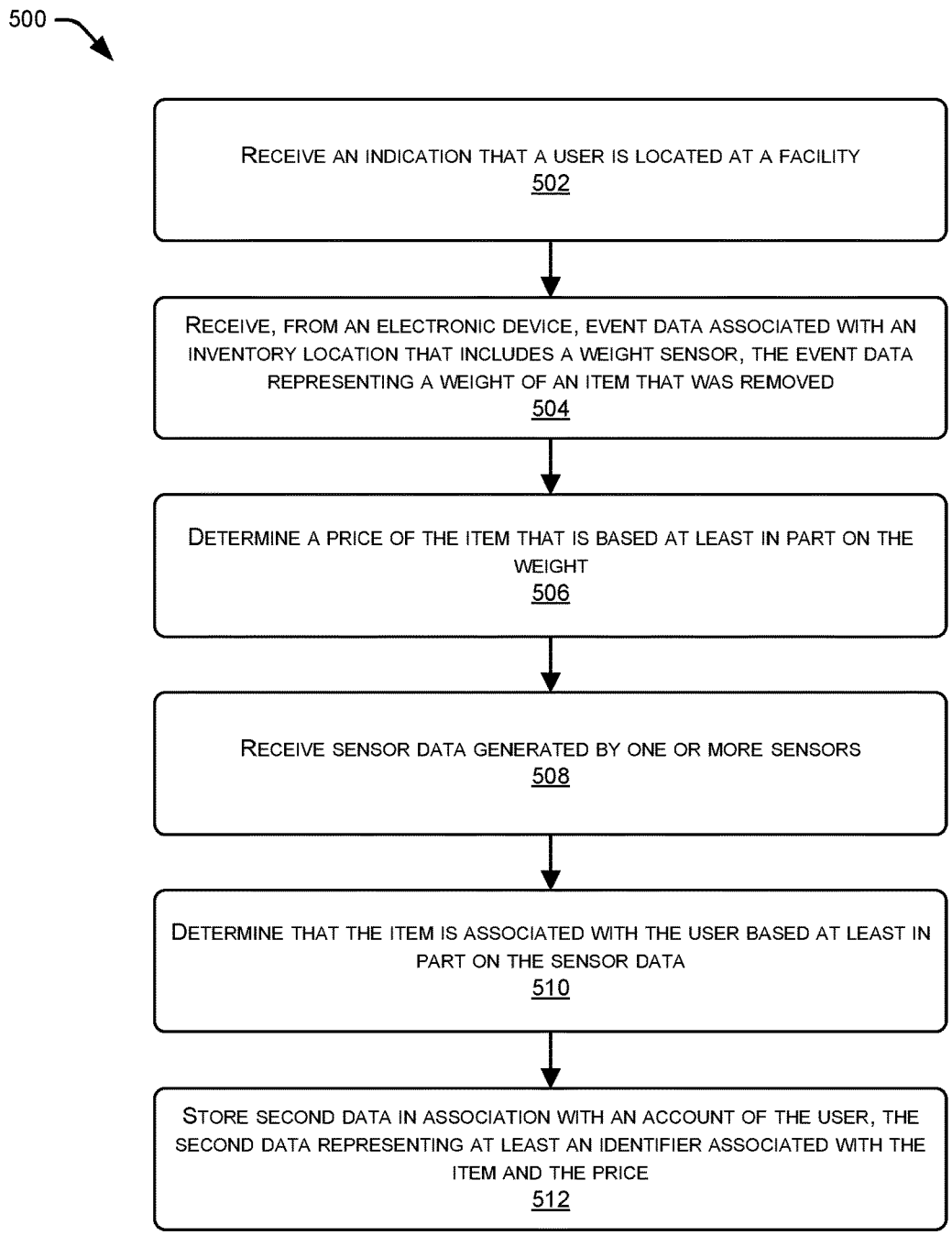
FIG. 5 is an example process for associating an event with an account of a user, where the event is for an item that is priced based at least in part on a weight of the item.

FIG. 5 is an example process 500 for associating an event with an account of a user, where the event is for an item that is priced based at least in part on a weight of the item. At 502, the process 500 may include receiving an indication that a user is located at a facility. For instance, a system may receive sensor data from one or more sensors located at the facility. In some examples, the sensor data includes a unique code and/or other identifier scanned from a mobile phone of the user. In some examples, the sensor data includes image data representing at least a portion of the user (e.g., image data representing the face of the user, image data representing the palm of the hand of the user, etc.). While these are just a couple of examples of account identification data, in other examples, the account identification data may include any type of data that identifies an account of the user.

At 504, the process 500 may include receiving, from an electronic device, event data associated with an inventory location that includes a weight sensor, the event data representing a weight of an item that was removed. For instance, the system may receive the event data from the electronic device. The event data may be generated by a weight sensor associated with the inventory location, where the weight sensor determines a change in the weight of the items located at the inventory location. For instance, as a user removes the item from the inventory location, the weight sensor may determine the change in weight that is caused by the item being removed.

At 506, the process 500 may include determining a price for the item that is based at least in part on the weight. For instance, the system may determine the price that is based at least in part on the weight. In some instances, the system determines the price using the weight and data indicating a price per unit weight associated with the item. In some instances, the system determines the price based at least in part on receiving data from the electronic device that indicates the price.

At 508, the process 500 may include receiving sensor data generated by one or more sensors and at 510, the process 500 may include determining that the item is associated with the user based at least in part on the sensor data. For instance, the system may receive the second sensor data and then analyze the sensor data to determine that the item is associated with the user. In some instances, to make the determination, the system may determine that the user was positioned around the inventory location at a time at which the item was removed from the inventory location. In some instances, to make the determination, the system may determine that the user removed the item from the inventory location.

At 512, the process 500 may include storing second data in association with an account of the user, the second data representing at least an identifier associated with the item and the price. For instance, after determining that the item is associated with the user, the system may then store the second data in association with the account. In some instances, prior to storing the second data and/or after storing the second data, the system may confirm that the user is removing the item from the facility. For example, the system may analyze sensor data to determine that the user did not return the item to the inventory location (and/or another inventory location) and/or exited the facility with the item.

Figure 6:
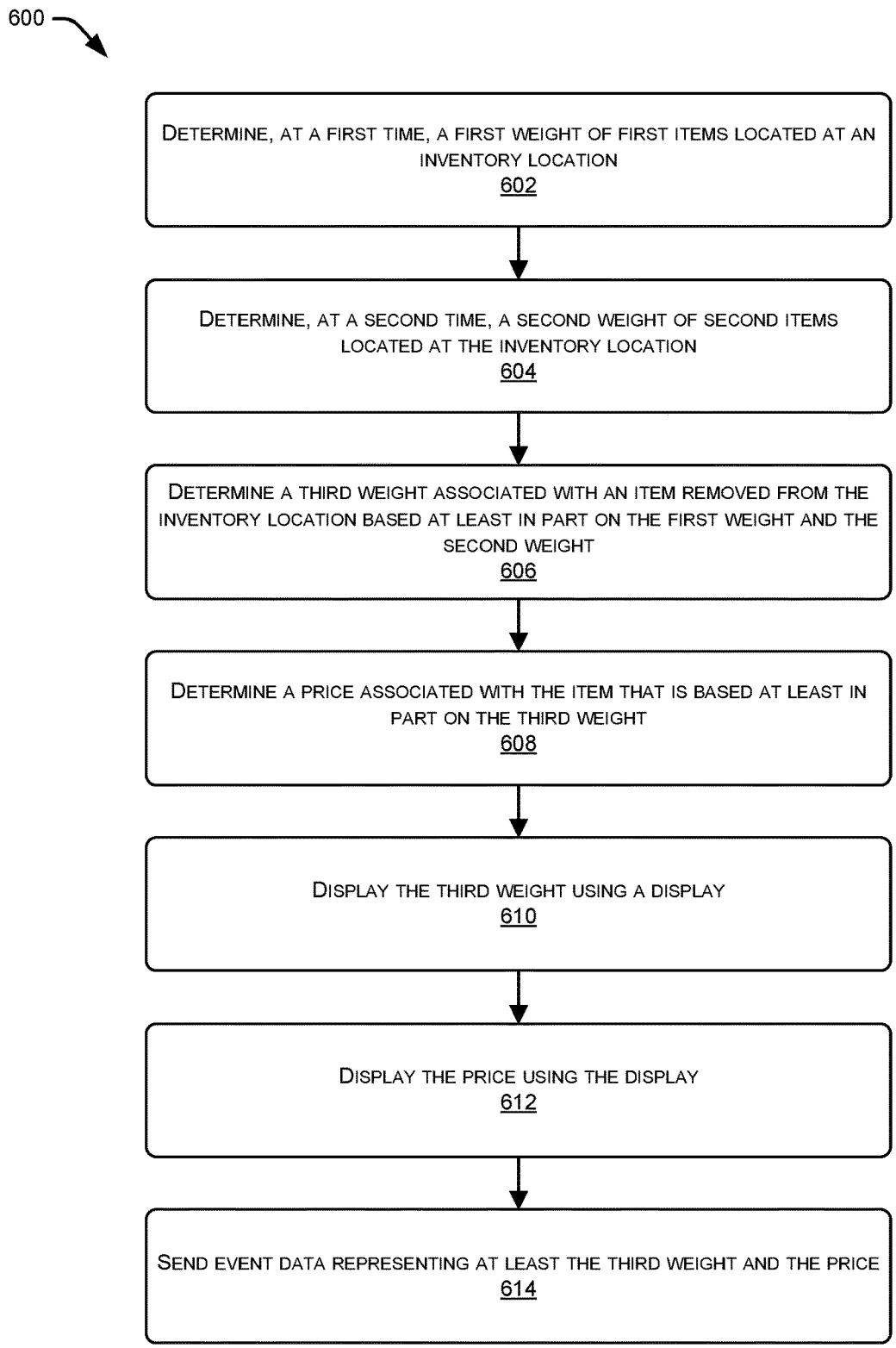
FIG. 6 is an example process for determining a weight associated with an item removed from an inventory location and then providing the weight and the price to a user.

FIG. 6 is an example process 600 for determining a weight associated with an item removed from an inventory location and then providing the weight and the price to a user. At 602, the process 600 may include determining, at a first time, a first weight of first items located at an inventory location. For instance, the electronic device 302 may receive, from the weight sensor 322, first sensor data representing the first weight of the first items. In some instances, the electronic device 302 receives the first sensor data between events that occur at the inventory location. For example, the electronic device 302 receive the first sensor data between times at which users are removing the items from the inventory location.

At 604, the process 600 may include determining, at a second time, a second weight of second items located at the inventory location. For instance, the electronic device 302 may receive, from the weight sensor 322, second sensor data representing the second weight. In some instances, the electronic device 302 receives the second sensor data at the elapse of a given time interval. In some instances, the electronic device 302 receives the second sensor data based on the weight sensor 322 detecting a change in the weight of the items. Still, in some instances, the electronic device 302 receives the second sensor data based on determining that a portion of a user is no longer located within a vertical space associated with the inventory location.

At 606, the process 600 may include determining a third weight associated with an item from the inventory location based at least in part on the first weight and the second weight. For instance, the system may determine the third weight by subtracting the second weight from the first weight. The third weight may represent the weight of the item that was removed from the inventory location.

At 608, the process 600 may include determining a price associated with the item that is based at least in part on the third weight. For instance, the electronic device 302 may determine the price that is based at least in part on the third weight. In some instances, the electronic device 302 determines the price using the third weight and data indicating a price per unit weight associated with the item. In some instances, the electronic device 302 determines the price based at least in part on receiving data from the system that indicates the price. For instance, the electronic device 302 may send, to the system, data representing the third weight and then receive the price in response.

At 610, the process 600 may include displaying the third weight using a display and at 612, the process 600 may include displaying the price using the display. For instance, the electronic device 302 may display the third weight and the price to the user.

At 614, the process 600 may include sending event data representing at least the third weight and the price. For instance, the electronic device 302 may send the event data to the system. In some instances, the electronic device 302 sends the third data based on determining that the event associated with the item is complete. For a first example, the electronic device 302 may send the event data based on determining that the weight being detected by the weight sensor 322 has not changed for a threshold period of time. For a second example, the electronic device 302 may send the event data based on receiving, from the user, input indicating that the user is finished. Still, for a third example, the electronic device 302 may send the event data based on receiving, from the system, data indicating that the event is complete.

Figure 7:
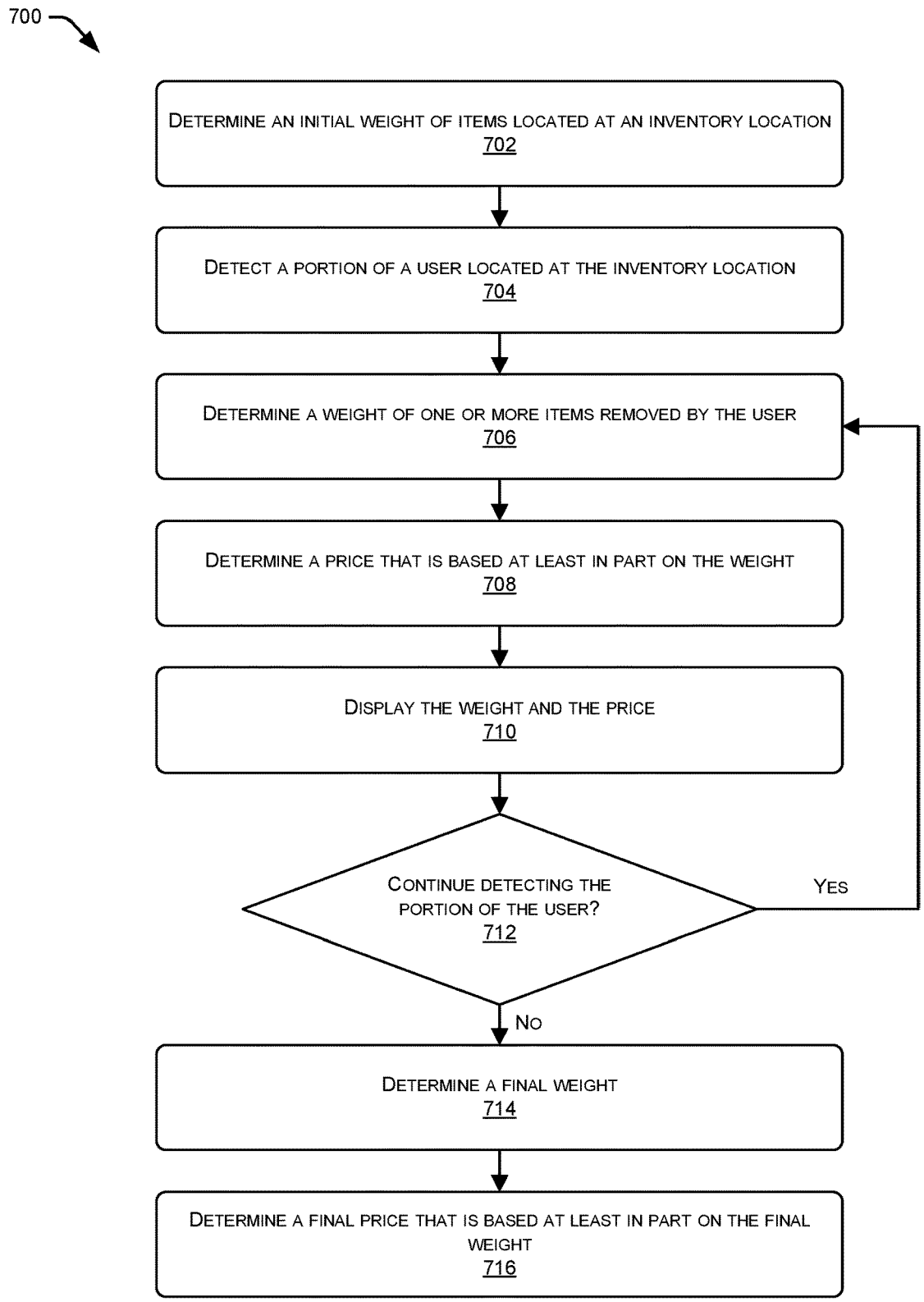
FIG. 7 is an example process for monitoring an event associated with a user removing and/or returning items to an inventory location.

FIG. 7 is an example process 700 for monitoring an event associated with a user removing and/or returning items to an inventory location. At 702, the process 700 may include determining an initial weight of items located at an inventory location. For instance, the electronic device 302 may receive, from the weight sensor 322, sensor data representing the initial weight of the items. In some instances, the electronic device 302 receives the sensor data between events that occur at the inventory location. For example, the electronic device 302 receive the sensor data between times at which users are removing the items from the inventory location.

At 704, the process 700 may include detecting a portion of a user at the inventory location. For instance, the electronic device 302 may detect the portion of the user located within the vertical volume above the inventory location. In some instances, the electronic device 302 detects the portion of the user using one or more sensors located at the inventory location. In some instances, the electronic device 302 detects the portion of the user by receiving, from the system, data indicating that the portion of the user is located within the vertical volume.

AT 706, the process 700 may include determining a weight of one or more items removed by the user. For instance, as the user is rummaging through the items, the electronic device 302 may receive, from the weight sensor 322, sensor data representing the weight of the remaining items. The electronic device 302 may then determine the weight of the one or more items removed using the initial weight and the weight of the remaining items. For instance, the electronic device 302 may determine the weight by subtracting the initial weight by the weight of the remaining items.

At 708, the process 700 may include determining a price that is based at least in part on the weight and at 710, the process 700 may include displaying the weight and the price. For instance, the electronic device 302 may continue to use weights for one or more removed items in order to determine the price. The electronic device 302 may then display the weight and the price to the user. This way, the user is able to determine the weight and the price as the user is removing and/or returning items.

At 712, the process 700 may include determining if the portion of the user is still detected. For instance, the electronic device 302 may determining if the portion of the user is still being detected within the vertical volume above the inventory location. In some instances, the electronic device 302 makes the determination using the one or more sensors located at the inventory location. In some instances, the electronic device 302 makes the determination by receiving, from the system, data indicating that the portion of the user is located within the vertical volume.

If, at 712, the portion of the user is still detected, then the process 700 may repeat back at 706. However, if, at 712, the portion of the user is no longer detected, then at 714, the process 700 may include determining a final weight. For instance, the electronic device 302 may determine that the event is over based on not detecting the user (and/or not detecting the user for a period of time). The electronic device 302 may then determine that the user is finished removing items and determine, using the weight sensor 322, the final weight.

At 706, the process 700 may include determining a final price that is based at least in part on the final weight. For instance, the electronic device 302 may determine the final price. The electronic device 302 may then send data indicating at least the final weight and the final price to the system.

Figure 8:
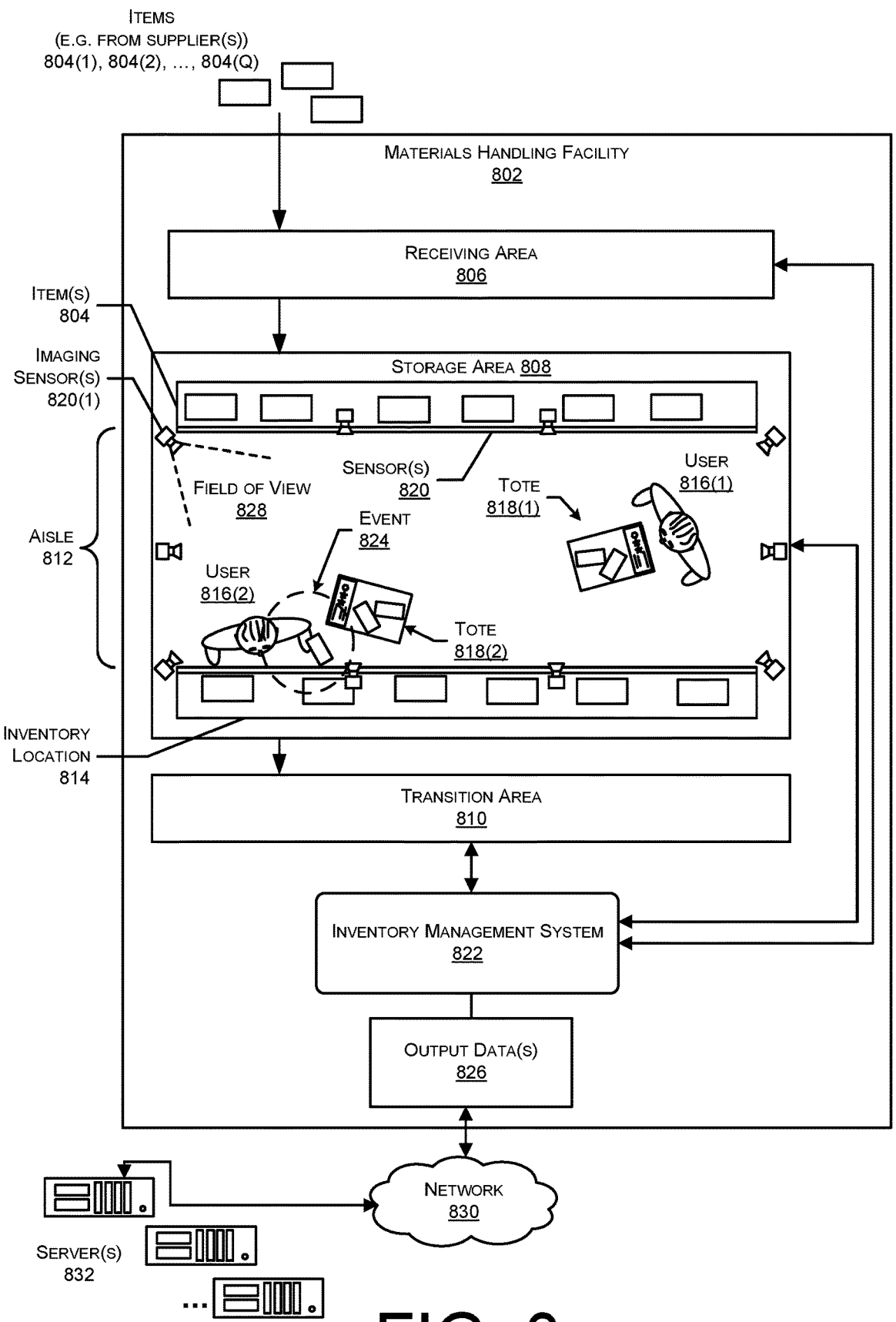
FIG. 8 is a block diagram of an example materials handling facility that includes sensors and an inventory management system configured to generate output regarding events occurring in the facility using the sensor data.
Figure 9:
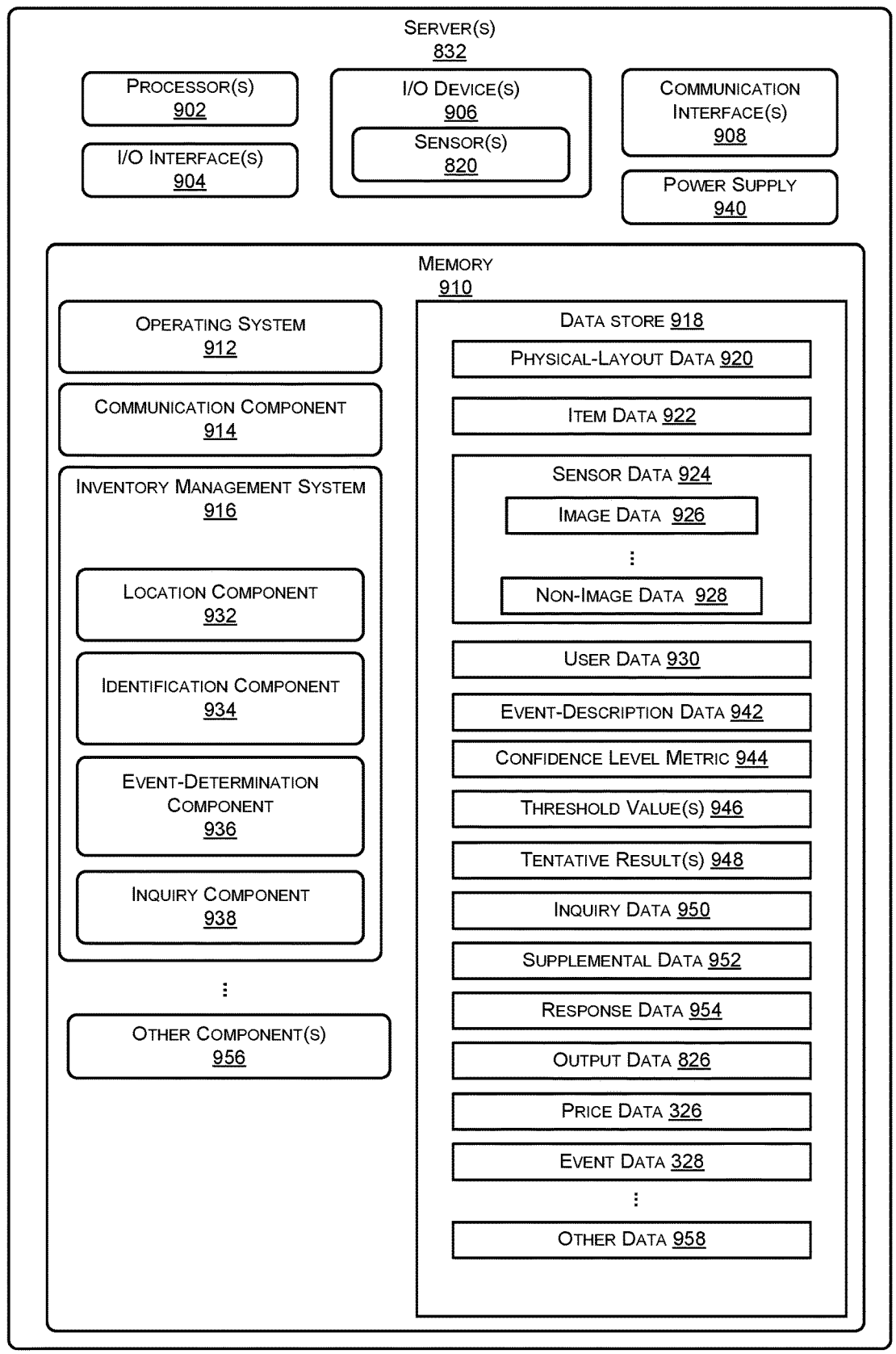
FIG. 9 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 8 and 9 represent an illustrative materials handing environment, such as the materials handling facility 802 (which, in some examples, may represent the facility 100), in which the techniques described herein may be applied to cameras monitoring the environments as described below. However, the following description is merely one illustrative example of an industry and environment in which the techniques described herein may be utilized. The materials handling facility 802 (or "facility") comprises one or more physical structures or areas within which one or more items 804(1), 804(2), . . . , 804(Q) (generally denoted as 804) may be held. As used in this disclosure, letters in parentheses such as "(Q)" indicate an integer result. The items 804 comprise physical goods, such as books, pharmaceuticals, repair parts, electronic gear, groceries, and so forth.

The facility 802 may include one or more areas designated for different functions with regard to inventory handling. In this illustration, the facility 802 includes a receiving area 806, a storage area 808, and a transition area 810. The receiving area 806 may be configured to accept items 804, such as from suppliers, for intake into the facility 802. For example, the receiving area 806 may include a loading dock at which trucks or other freight conveyances unload the items 804.

The storage area 808 is configured to store the items 804. The storage area 808 may be arranged in various physical configurations. In one implementation, the storage area 808 may include one or more aisles 812. The aisle 812 may be configured with, or defined by, inventory locations 814 on one or both sides of the aisle 812. The inventory locations 814 may include one or more of shelves, racks, cases, cabinets, bins, floor locations, or other suitable storage mechanisms for holding or storing the items 804. The inventory locations 814 may be affixed to the floor or another portion of the facility's structure, or may be movable such that the arrangements of aisles 812 may be reconfigurable. In some implementations, the inventory locations 814 may be configured to move independently of an outside operator. For example, the inventory locations 814 may comprise a rack with a power source and a motor, operable by a computing device to allow the rack to move from one location within the facility 802 to another.

One or more users 816(1), 816(2) (generally denoted as 816), totes 818(1), 818(2) (generally denoted as 818) or other material handling apparatus may move within the facility 802. For example, the users 816 may move about within the facility 802 to pick or place the items 804 in various inventory locations 814, placing them on the totes 818 for ease of transport. An individual tote 818 is configured to carry or otherwise transport one or more items 804. For example, a tote 818 may include a basket, a cart, a bag, and so forth. In other implementations, other agencies such as robots, forklifts, cranes, aerial drones, and so forth, may move about the facility 802 picking, placing, or otherwise moving the items 804.

One or more sensors 820 may be configured to acquire information in the facility 802. The sensors 820 in the facility 802 may include sensors fixed in the environment (e.g., ceiling-mounted cameras) or otherwise, such as sensors in the possession of users (e.g., mobile phones, tablets, etc.). The sensors 820 may include, but are not limited to, cameras 820(1), weight sensors, radio frequency (RF) receivers, temperature sensors, humidity sensors, vibration sensors, and so forth. The sensors 820 may be stationary or mobile, relative to the facility 802. For example, the inventory locations 814 may contain cameras 820(1) configured to acquire images of pick or placement of items 804 on shelves, of the users 816(1) and 816(2) in the facility 802, and so forth. In another example, the floor of the facility 802 may include weight sensors configured to determine a weight of the users 816 or another object thereupon.

During operation of the facility 802, the sensors 820 may be configured to provide information suitable for tracking how objects move or other occurrences within the facility 802. For example, a series of images acquired by a camera 820(1) may indicate removal of an item 804 from a particular inventory location 814 by one of the users 816 and placement of the item 804 on or at least partially within one of the totes 818.

While the storage area 808 is depicted as having one or more aisles 812, inventory locations 814 storing the items 804, sensors 820, and so forth, it is understood that the receiving area 806, the transition area 810, or other areas of the facility 802 may be similarly equipped. Furthermore, the arrangement of the various areas within the facility 802 is depicted functionally rather than schematically. For example, multiple different receiving areas 806, storage areas 808, and transition areas 810 may be interspersed rather than segregated in the facility 802.

The facility 802 may include, or be coupled to, an inventory management system 822, which may perform some or all of the techniques described above with reference to FIGS. 1A-6. For example, the inventory management system 822 may maintain a virtual cart of each user within the facility. The inventory management system 822 may also store a record associated with each user indicating the identity of the user, the location of the user, and whether the user is eligible to exit the facility with one or more items without performing a manual checkout of the items. The inventory management system 822 may also generate and output notification data to the users, indicating whether or not they are so eligible.

As illustrated, the inventory management system 822 may reside at the facility 802 (e.g., as part of on-premises servers), on the servers 832 that are remote from the facility 802, a combination thereof. In each instance, the inventory management system 822 is configured to identify interactions and events with and between users 816, devices such as sensors 820, robots, material handling equipment, computing devices, and so forth, in one or more of the receiving area 806, the storage area 808, or the transition area 810. As described above, some interactions may further indicate the existence of one or more events 824, or predefined activities of interest. For example, events 824 may include the entry of the user 816 to the facility 802, stocking of items 804 at an inventory location 814, picking of an item 804 from an inventory location 814, returning of an item 804 to an inventory location 814, placement of an item 804 within a tote 818, movement of users 816 relative to one another, gestures by the users 816, and so forth. Other events 824 involving users 816 may include the user 816 providing authentication information in the facility 802, using a computing device at the facility 802 to authenticate identity to the inventory management system 822, and so forth. Some events 824 may involve one or more other objects within the facility 802. For example, the event 824 may comprise movement within the facility 802 of an inventory location 814, such as a counter mounted on wheels. Events 824 may involve one or more of the sensors 820. For example, a change in operation of a sensor 820, such as a sensor failure, change in alignment, and so forth, may be designated as an event 824. Continuing the example, movement of a camera 820(1) resulting in a change in the orientation of the field of view 828 (such as resulting from someone or something bumping the camera 820(1)) may be designated as an event 824.

By determining the occurrence of one or more of the events 824, the inventory management system 822 may generate output data 826. The output data 826 comprises information about the event 824. For example, where the event 824 comprises an item 804 being removed from an inventory location 814, the output data 826 may comprise an item identifier indicative of the particular item 804 that was removed from the inventory location 814 and a user identifier of a user that removed the item.

The inventory management system 822 may use one or more automated systems to generate the output data 826. For example, an artificial neural network, one or more classifiers, or other automated machine learning techniques may be used to process the sensor data from the one or more sensors 820 to generate output data 826. For example, the inventory management system 822 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 826 or the tentative results. The automated systems may generate confidence level data that provides information indicative of the accuracy or confidence that the output data 826 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 98%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 804, user 816, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 816 may pick an item 804(1) such as a perfume bottle that is generally cubical in shape from the inventory location 814. Other items 804 at nearby inventory locations 814 may be predominantly spherical. Based on the difference in shape (cube vs. sphere) from the adjacent items, and the correspondence in shape with the previously stored image of the perfume bottle item 804(1) (cubical and cubical), the confidence level that the user 102 has picked up the perfume bottle item 804(1) is high.

In some situations, the automated techniques may be unable to generate output data 826 with a confidence level above a threshold result. For example, the automated techniques may be unable to distinguish which user 816 in a crowd of users 816 has picked up the item 804 from the inventory location 814. In other situations, it may be desirable to provide human confirmation of the event 824 or of the accuracy of the output data 826. For example, some items 804 may be deemed age restricted such that they are to be handled only by users 816 above a minimum age threshold.

In instances where human confirmation is desired, sensor data associated with an event 824 may be processed to generate inquiry data. The inquiry data may include a subset of the sensor data associated with the event 824. The inquiry data may also include one or more of one or more tentative results as determined by the automated techniques, or supplemental data. The subset of the sensor data may be determined using information about the one or more sensors 820. For example, camera data such as the location of the camera 820(1) within the facility 802, the orientation of the camera 820(1), and a field of view 828 of the camera 820(1) may be used to determine if a particular location within the facility 802 is within the field of view 828. The subset of the sensor data may include images that may show the inventory location 814 or that the item 804 was stowed. The subset of the sensor data may also omit images from other cameras 820(1) that did not have that inventory location 814 in the field of view 828. The field of view 828 may comprise a portion of the scene in the facility 802 that the sensor 820 is able to generate sensor data about.

Continuing the example, the subset of the sensor data may comprise a video clip acquired by one or more cameras 820(1) having a field of view 828 that includes the item 804. The tentative results may comprise the "best guess" as to which items 804 may have been involved in the event 824. For example, the tentative results may comprise results determined by the automated system that have a confidence level above a minimum threshold.

The facility 802 may be configured to receive different kinds of items 804 from various suppliers and to store them until a customer orders or retrieves one or more of the items 804. A general flow of items 804 through the facility 802 is indicated by the arrows of FIG. 8. Specifically, as illustrated in this example, items 804 may be received from one or more suppliers, such as manufacturers, distributors, wholesalers, and so forth, at the receiving area 806. In various implementations, the items 804 may include merchandise, commodities, perishables, or any suitable type of item 804, depending on the nature of the enterprise that operates the facility 802. The receiving of the items 804 may comprise one or more events 824 for which the inventory management system 822 may generate output data 826.

Upon being received from a supplier at receiving area 806, the items 804 may be prepared for storage. For example, items 804 may be unpacked or otherwise rearranged. The inventory management system 822 may include one or more software applications executing on a computer system to provide inventory management functions based on the events 824 associated with the unpacking or rearrangement. These inventory management functions may include maintaining information indicative of the type, quantity, condition, cost, location, weight, or any other suitable parameters with respect to the items 804. The items 804 may be stocked, managed, or dispensed in terms of countable, individual units or multiples, such as packages, cartons, crates, pallets, or other suitable aggregations. Alternatively, some items 804, such as bulk products, commodities, and so forth, may be stored in continuous or arbitrarily divisible amounts that may not be inherently organized into countable units. Such items 804 may be managed in terms of measurable quantity such as units of length, area, volume, weight, time, duration, or other dimensional properties characterized by units of measurement. Generally speaking, a quantity of an item 804 may refer to either a countable number of individual or aggregate units of an item 804 or a measurable amount of an item 804, as appropriate.

After arriving through the receiving area 806, items 804 may be stored within the storage area 808. In some implementations, like items 804 may be stored or displayed together in the inventory locations 814 such as in bins, on shelves, hanging from pegboards, and so forth. In this implementation, all items 804 of a given kind are stored in one inventory location 814. In other implementations, like items 804 may be stored in different inventory locations 814. For example, to optimize retrieval of certain items 804 having frequent turnover within a large physical facility 802, those items 804 may be stored in several different inventory locations 814 to reduce congestion that might occur at a single inventory location 814. Storage of the items 804 and their respective inventory locations 814 may comprise one or more events 824.

When a customer order specifying one or more items 804 is received, or as a user 816 progresses through the facility 802, the corresponding items 804 may be selected or "picked" from the inventory locations 814 containing those items 804. In various implementations, item picking may range from manual to completely automated picking. For example, in one implementation, a user 816 may have a list of items 804 they desire and may progress through the facility 802 picking items 804 from inventory locations 814 within the storage area 808, and placing those items 804 into a tote 818. In other implementations, employees of the facility 802 may pick items 804 using written or electronic pick lists derived from customer orders. These picked items 804 may be placed into the tote 818 as the employee progresses through the facility 802. Picking may comprise one or more events 824, such as the user 816 in moving to the inventory location 814, retrieval of the item 804 from the inventory location 814, and so forth.

After items 804 have been picked, they may be processed at a transition area 810. The transition area 810 may be any designated area within the facility 802 where items 804 are transitioned from one location to another or from one entity to another. For example, the transition area 810 may be a packing station within the facility 802. When the item 804 arrives at the transition area 810, the items 804 may be transitioned from the storage area 808 to the packing station. The transitioning may comprise one or more events 824. Information about the transition may be maintained by the inventory management system 822 using the output data 826 associated with those events 824.

In another example, if the items 804 are departing the facility 802 a list of the items 804 may be obtained and used by the inventory management system 822 to transition responsibility for, or custody of, the items 804 from the facility 802 to another entity. For example, a carrier may accept the items 804 for transport with that carrier accepting responsibility for the items 804 indicated in the list. In another example, a customer may purchase or rent the items 804 and remove the items 804 from the facility 802. The purchase or rental may comprise one or more events 824.

The inventory management system 822 may access or generate sensor data about the facility 802 and the contents therein including the items 804, the users 816, the totes 818, and so forth. The sensor data may be acquired by one or more of the sensors 820, data provided by other systems, and so forth. For example, the sensors 820 may include cameras 820(1) configured to acquire image data of scenes in the facility 802. The image data may comprise still images, video, or a combination thereof. The image data may be processed by the inventory management system 822 to determine a location of the user 816, the tote 818, the identity of the user 816, and so forth. As used herein, the identity of the user may represent a unique identifier of the user (e.g., name, number associated with user, username, etc.), an identifier that distinguishes the user amongst other users being located within the environment, or the like.

The inventory management system 822, or systems coupled thereto, may be configured to identify the user 816, as well as to determine other candidate users. In one implementation, this determination may comprise comparing sensor data with previously stored identity data. For example, the user 816 may be identified by showing their face to a facial recognition system, by presenting a token carrying authentication credentials, providing a fingerprint, scanning a barcode or other type of unique identifier upon entering the facility, and so forth. Identity of the user 816 may be determined before, during, or after entry to the facility 802. Determination of the user's 816 identity may comprise comparing sensor data associated with the user 816 in the facility 802 to previously stored user data.

In some instances, the inventory management system 822 groups users within the facility into respective sessions. That is, the inventory management system 822 may utilize the sensor data to determine groups of users that are effectively "together" (e.g., shopping together). In some instances, a particular session may include multiple users that entered the facility 802 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 818. Noting the child and the mother as belonging to the same session may increase the chances of successfully adding the box of cereal to the virtual shopping cart of the mother.

By determining the occurrence of one or more events 824 and the output data 826 associated therewith, the inventory management system 822 is able to provide one or more services to the users 816 of the facility 802. By utilizing one or more human associates to process inquiry data and generate response data that may then be used to produce output data 826, overall accuracy of the system may be enhanced. The enhanced accuracy may improve the user experience of the one or more users 816 of the facility 802. In some examples, the output data 826 may be transmitted over a network 830 to one or more servers 832.

In some instances, one or more of the inventory locations may be similar to the inventory locations 108 and/or the inventory location 300. For example, the one or more of the inventory locations may include devices and weight sensors that communicate with the inventory management system 822 and/or the server(s) 832. This may allow the users 816 to acquire items that are priced per unit weight, similar to the processes described in the examples of FIGS. 1A-6.

FIG. 8 illustrates a block diagram of the one or more servers 832. The servers 832 may be physically present at the facility 802, may be accessible by the network 830, or a combination of both. The servers 832 do not require end-user knowledge of the physical location and configuration of the system that delivers the services. Common expressions associated with the servers 832 may include "on-demand computing," "software as a service (SaaS)," "cloud services," "data centers," and so forth. Services provided by the servers 832 may be distributed across one or more physical or virtual devices.

The servers 832 may include one or more hardware processors 902 (processors) configured to execute one or more stored instructions. The processors 902 may comprise one or more cores. The servers 832 may include one or more input/output (I/O) interface(s) 904 to allow the processor 902 or other portions of the servers 832 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, and so forth. The server(s) 832 may further include I/O device(s) 906 that include the sensor(s) 820.

The servers 832 may also include one or more communication interfaces 908. The communication interfaces 908 are configured to provide communications between the servers 832 and other devices, such as the sensors 820, the interface devices, routers, and so forth. The communication interfaces 908 may include devices configured to couple to personal area networks (PANs), wired and wireless local area networks (LANs), wired and wireless wide area networks (WANs), and so forth. For example, the communication interfaces 908 may include devices compatible with Ethernet, Wi-Fi™, and so forth. The servers 832 may also include one or more busses or other internal communications hardware or software that allow for the transfer of data between the various modules and components of the servers 832.

The servers 832 may also include a power supply 940. The power supply 940 is configured to provide electrical power suitable for operating the components in the servers 832.

The servers 832 may further include one or more memories 910. The memory 910 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 832. A few example functional modules are shown stored in the memory 910, although the same functionality may alternatively be implemented in hardware, firmware, or as a system on a chip (SOC).

The memory 910 may include at least one operating system (OS) component 912. The OS component 912 is configured to manage hardware resource devices such as the I/O interfaces 904, the communication interfaces 908, and provide various services to applications or components executing on the processors 902. The OS component 912 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 910. These components may be executed as foreground applications, background tasks, daemons, and so forth. A communication component 914 may be configured to establish communications with one or more of the sensors 820, one or more of the devices used by associates, other servers 832, or other devices. The communications may be authenticated, encrypted, and so forth.

The memory 910 may store an inventory management system 916. The inventory management system 916 is configured to provide the inventory functions as described herein with regard to the inventory management system 822. For example, the inventory management system 916 may track movement of items 584 in the facility 802, generate user interface data, and so forth.

The inventory management system 916 may access information stored in one or more data stores 688 in the memory 610. The data store 918 may use a flat file, database, linked list, tree, executable code, script, or other data structure to store the information. In some implementations, the data store 918 or a portion of the data store 918 may be distributed across one or more other devices including other servers 832, network attached storage devices, and so forth.

The data store 918 may include physical layout data 920. The physical layout data 920 provides a mapping of physical locations within the physical layout of devices and objects such as the sensors 820, inventory locations 814, and so forth. The physical layout data 920 may indicate the coordinates within the facility 802 of an inventory location 814, sensors 820 within view of that inventory location 814, and so forth. For example, the physical layout data 920 may include camera data comprising one or more of a location within the facility 802 of a camera 820(1), orientation of the camera 820(1), the operational status, and so forth. Continuing example, the physical layout data 920 may indicate the coordinates of the camera 820(1), pan and tilt information indicative of a direction that the field of view 828 is oriented along, whether the camera 820(1) is operating or malfunctioning, and so forth.

In some implementations, the inventory management system 916 may access the physical layout data 920 to determine if a location associated with the event 824 is within the field of view 828 of one or more sensors 820. Continuing the example above, given the location within the facility 802 of the event 824 and the camera data, the inventory management system 916 may determine the cameras 820(1) that may have generated images of the event 824.

The item data 922 (which may include the item data 418) comprises information associated with the items 804. The information may include information indicative of one or more inventory locations 814 at which one or more of the items 804 are stored. The item data 922 may also include order data, SKU or other product identifier, price, quantity on hand, weight, expiration date, images of the item 804, detail description information, ratings, ranking, and so forth. The inventory management system 916 may store information associated with inventory management functions in the item data 922.

The data store 918 may also include sensor data 924. The sensor data 924 comprises information acquired from, or based on, the one or more sensors 820. For example, the sensor data 924 may comprise 3D information about an object in the facility 802. As described above, the sensors 820 may include a camera 820(1), which is configured to acquire one or more images. These images may be stored as the image data 926. The image data 926 may comprise information descriptive of a plurality of picture elements or pixels. Non-image data 928 may comprise information from other sensors 820, such as input from microphones, weight sensors, and so forth.

User data 930 may also be stored in the data store 918. The user data 930 may include identity data, information indicative of a profile, purchase history, location data, images of the user 816, demographic data, and so forth. Individual users 816 or groups of users 816 may selectively provide user data 930 for use by the inventory management system 822. The individual users 816 or groups of users 816 may also authorize collection of the user data 930 during use of the facility 802 or access to user data 930 obtained from other systems. For example, the user 816 may opt-in to collection of the user data 930 to receive enhanced services while using the facility 802.

In some implementations, the user data 930 may include information designating a user 816 for special handling. For example, the user data 930 may indicate that a particular user 816 has been associated with an increased number of errors with respect to output data 826. The inventory management system 916 may be configured to use this information to apply additional scrutiny to the events 824 associated with this user 816. For example, events 824 that include an item 504 having a cost or result above the threshold amount may be provided to the associates for processing regardless of the determined level of confidence in the output data 826 as generated by the automated system.

The inventory management system 916 may include one or more of a location component 932, identification component 934, event-determination component 936, and inquiry component 938, potentially amongst other components 956.

The location component 932 functions to locate items or users within the environment of the facility to allow the inventory management system 916 to assign certain events to the correct users. That is, the location component 932 may assign unique identifiers to users as they enter the facility and, with the users' consent, may locate the users throughout the facility 802 over the time they remain in the facility 802. The location component 932 may perform this locating using sensor data 924, such as the image data 926. For example, the location component 932 may receive the image data 926 and may use facial-recognition techniques to identify users from the images. After identifying a particular user within the facility, the location component 932 may then locate the user within the images as the user moves throughout the facility 802. Further, should the location component 932 temporarily "lose" a particular user, the location component 932 may again attempt to identify the users within the facility based on facial recognition, and/or using other techniques such as voice recognition, or the like.

Therefore, upon receiving the indication of the time and location of the event in question, the location component 932 may query the data store 918 to determine which one or more users were at or within a threshold distance of the location of the event at the particular time of the event. Further, the location component 932 may assign different confidence levels to different users, with the confidence levels indicating how likely it is that each corresponding user is the user that is in fact associated with the event of interest.

The location component 932 may access the sensor data 924 in order to determine this location data of the user and/or items. The location data provides information indicative of a location of an object, such as the item 804, the user 816, the tote 818, and so forth. The location may be absolute with respect to the facility 802 or relative to another object or point of reference. Absolute terms may comprise a latitude, longitude, and altitude with respect to a geodetic reference point. Relative terms may include a location of 25.4 meters (m) along an x-axis and 85.2 m along a y-axis as designated by a floor plan of the facility 502, 5.2 m from an inventory location 814 along a heading of 169°, and so forth. For example, the location data may indicate that the user 816(1) is 25.2 m along the aisle 812(1) and standing in front of the inventory location 814. In comparison, a relative location may indicate that the user 816(1) is 32 cm from the tote 818 at a heading of 83° with respect to the tote 818. The location data may include orientation information, such as which direction the user 816 is facing. The orientation may be determined by the relative direction the user's 816 body is facing. In some implementations, the orientation may be relative to the interface device. Continuing the example, the location data may indicate that the user 816(1) is oriented with a heading of 0°, or looking north. In another example, the location data may indicate that the user 816 is facing towards the interface device.

The identification component 934 is configured to identify an object. In one implementation, the identification component 934 may be configured to identify an item 804. In another implementation, the identification component 934 may be configured to identify the user 816. For example, the identification component 934 may use facial recognition techniques to process the image data 926 and determine the identity data of the user 816 depicted in the images by comparing the characteristics in the image data 926 with previously stored results. The identification component 934 may also access data from other sensors 820, such as from an RFID reader, an RF receiver, fingerprint sensors, and so forth.

The event-determination component 936 is configured to process the sensor data 924 and generate output data 826, and may include components described above. The event-determination component 936 may access information stored in the data store 918 including, but not limited to, event-description data 942, confidence levels 944, or threshold values 646. In some instances, the event-determination component 936 may be configured to perform some or all of the techniques described above with regards to the event-determination component 936. For instance, the event-determination component 936 may be configured to create and utilize event classifiers for identifying events (e.g., predefined activity) within image data, potentially without use of other sensor data acquired by other sensors in the environment.

The event-description data 942 comprises information indicative of one or more events 824. For example, the event-description data 942 may comprise predefined profiles that designate movement of an item 804 from an inventory location 814 with the event 824 of "pick". The event-description data 942 may be manually generated or automatically generated. The event-description data 942 may include data indicative of triggers associated with events occurring in the facility 802. An event may be determined as occurring upon detection of the trigger. For example, sensor data 924 such as a change in weight from a weight sensor 820 at an inventory location 914 may trigger detection of an event of an item 804 being added or removed from the inventory location 814. In another example, the trigger may comprise an image of the user 816 reaching a hand toward the inventory location 814. In yet another example, the trigger may comprise two or more users 816 approaching to within a threshold distance of one another.

The event-determination component 936 may process the sensor data 924 using one or more techniques including, but not limited to, artificial neural networks, classifiers, decision trees, support vector machines, Bayesian networks, and so forth. For example, the event-determination component 936 may use a decision tree to determine occurrence of the "pick" event 824 based on sensor data 924. The event-determination component 936 may further use the sensor data 924 to determine one or more tentative results 948. The one or more tentative results 948 comprise data associated with the event 824. For example, where the event 824 comprises a disambiguation of users 816, the tentative results 948 may comprise a list of possible user 816 identities. In another example, where the event 824 comprises a disambiguation between items, the tentative results 948 may comprise a list of possible item identifiers. In some implementations, the tentative result 948 may indicate the possible action. For example, the action may comprise the user 816 picking, placing, moving an item 804, damaging an item 804, providing gestural input, and so forth.

In some implementations, the tentative results 948 may be generated by other components. For example, the tentative results 948 such as one or more possible identities or locations of the user 816 involved in the event 824 may be generated by the location component 932. In another example, the tentative results 948 such as possible items 804 that may have been involved in the event 824 may be generated by the identification component 934.

The event-determination component 936 may be configured to provide a confidence level 944 associated with the determination of the tentative results 948. The confidence level 944 provides indicia as to the expected level of accuracy of the tentative result 948. For example, a low confidence level 944 may indicate that the tentative result 948 has a low probability of corresponding to the actual circumstances of the event 824. In comparison, a high confidence level 944 may indicate that the tentative result 948 has a high probability of corresponding to the actual circumstances of the event 824.

In some implementations, the tentative results 948 having confidence levels 944 that exceed the threshold may be deemed to be sufficiently accurate and thus may be used as the output data 956. For example, the event-determination component 936 may provide tentative results 948 indicative of the three possible items 804(1), 804(2), and 804(3) corresponding to the "pick" event 824. The confidence levels 944 associated with the possible items 804(1), 804(2), and 804(3) may be 25%, 80%, 92%, respectively. Continuing the example, the threshold value 946 may be set such that confidence level 944 of 90% are deemed to be sufficiently accurate. As a result, the event-determination component 936 may designate the "pick" event 824 as involving item 804(3).

The inquiry component 938 may be configured to use at least a portion of the sensor data 924 associated with the event 824 to generate inquiry data 950. In some implementations, the inquiry data 950 may include one or more of the tentative results 948 or supplemental data 952. The inquiry component 938 may be configured to provide inquiry data 950 to one or more devices associated with one or more human associates.

An associate user interface is presented on the respective devices of associates. The associate may generate response data 954 by selecting a particular tentative result 948, entering new information, indicating that they are unable to answer the inquiry, and so forth.

The supplemental data 952 comprises information associated with the event 824 or that may be useful in interpreting the sensor data 924. For example, the supplemental data 952 may comprise previously stored images of the items 804. In another example, the supplemental data 952 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 938 processes the response data 954 provided by the one or more associates. The processing may include calculating one or more statistical results associated with the response data 954. For example, statistical results may include a count of the number of times associates selected a particular tentative result 948, determination of a percentage of the associates that selected a particular tentative result 948, and so forth.

The inquiry component 938 is configured to generate the output data 956 based at least in part on the response data 954. For example, given that a majority of the associates returned response data 954 indicating that the item 804 associated with the "pick" event 824 is item 804(5), the output data 826 may indicate that the item 804(5) was picked.

The inquiry component 938 may be configured to selectively distribute inquiries to particular associates. For example, some associates may be better suited to answering particular types of inquiries. Performance data, such as statistical data about the performance of the associates, may be determined by the inquiry component 938 from the response data 954 provided by the associates. For example, information indicative of a percentage of different inquiries in which the particular associate selected response data 954 that disagreed with the majority of associates may be maintained. In some implementations, test or practice inquiry data 950 having a previously known correct answer may be provided to the associate for training or quality assurance purposes. The determination of the set of associates to use may be based at least in part on the performance data.

By using the inquiry component 938, the event-determination component 936 may be able to provide high reliability output data 956 that accurately represents the event 824. The output data 956 generated by the inquiry component 938 from the response data 954 may also be used to further train the automated systems used by the inventory management system 916. For example, the sensor data 924 and the output data 956, based on response data 954, may be provided to one or more of the components of the inventory management system 916 for training in process improvement. Continuing the example, this information may be provided to an artificial neural network, Bayesian network, and so forth, to further train these systems such that the confidence level 944 and the tentative results 948 produced in the future for the same or similar input is improved. Finally, as FIG. 8 illustrates, the servers 832 may store and/or utilize other data 958.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
receiving an indication that a user is located at a facility;
receiving, from an electronic device, first data associated with an inventory location that includes an associate, a weight sensor, and a vertical volume located above a receptacle containing an item, the first data representing a weight of the item that was removed, by the associate and for the user, from the inventory location;
determining a price of the item that is based at least in part on the weight and a price per unit weight associated with the item;
receiving sensor data generated by one or more sensors, the sensor data including data indicative of the one or more sensors detecting a hand of the associate entering the vertical volume and data indicative of the one or more sensors detecting the user was positioned next to the associate at the inventory location at a time that the hand of the associate entered the vertical volume and removed the item;
determining, based at least in part on the sensor data, that the item is associated with the user; and
storing second data in association with an account of the user, the second data representing at least an identifier associated with the item and the price.

2. The method as recited in claim 1, further comprising:
detecting the user exiting the facility; and
based at least in part on detecting that the user is exiting the facility, charging a payment instrument of the user for the price of the item.

3. The method as recited in claim 1, wherein determining that the item is associated with the user comprises:
determining that the user received the item from the associate.

4. The method as recited in claim 1, further comprising:
receiving additional sensor data generated by the one or more sensors; and
determining, based at least in part on the additional sensor data, that the user removed the item from an area of the facility that includes the inventory location,
and wherein storing the second data in association with the account of the user is based at least in part on determining that the user removed the item from the area.

5. The method as recited in claim 1, wherein determining the price of the item comprises receiving, from the electronic device, third data representing the price of the item.

6. The method as recited in claim 1, wherein determining the price of the item comprises:
storing third data representing the price per unit weight associated with the item; and
determining the price of the item based at least in part on the weight and the price per unit weight.

7. The method as recited in claim 1, further comprising:
receiving, from an additional electronic device, third data associated with an additional inventory location that includes an additional weight sensor, the third data representing an additional weight of an additional item that was removed from the additional inventory location, the item and the additional item including a same item type,
and wherein determining the price of the item is further based at least in part on the additional weight.

8. The method as recited in claim 1, further comprising:
receiving, from an additional electronic device, third data associated with an additional inventory location that includes an additional weight sensor, the third data representing an additional weight of an additional item that was returned to the additional inventory location, the item and the additional item including a same item type,
and wherein determining the price of the item is further based at least in part on the additional weight.

9. The method as recited in claim 1, wherein the item includes a first type of item, and wherein the method further comprises:

receiving, from an additional electronic device, third data associated with an additional inventory location that includes an additional weight sensor, the third data representing an additional weight of an additional item that was removed from the additional inventory location, the additional item including a second type of item;

determining an additional price of the additional item based at least in part on the additional weight; and determining a total price based at least in part on the price and the additional price, and wherein the second data further indicates the total price.

10. The method as recited in claim 1, wherein the sensor data including the data indicative of the one or more sensors detecting the hand of the associate entering the vertical volume further includes data indicative of the one or more sensors detecting the hand of the associate exiting the vertical volume.

11. The method as recited in claim 10, wherein determining that the item is associated with the user comprises determining, based at least in part on the sensor data, that the hand of the associate entered the vertical volume and exited the vertical volume at a time that the item was removed from the inventory location.

12. A method comprising:

receiving, from an electronic device, first data associated with an inventory location that includes an associate, a weight sensor, and a vertical volume located above the inventory location, the first data representing a weight of an item that was removed, by the associate and for the user, from the inventory location;

determining a price of the item that is based at least in part on the weight and a price per unit weight associated with the item;

receiving sensor data generated by one or more sensors, the sensor data including data indicative of the one or more sensors detecting a portion of the associate entering the vertical volume and exiting the vertical volume and data indicative of the one or more sensors detecting the user was positioned next to the associate at the inventory location at a time that the portion of the associate entered the vertical volume and removed the item;

determining, based at least in part on the sensor data, that the item is associated with the user; and storing second data in association with an account of the user, the second data representing at least an identifier associated with the item and the price.

13. The method as recited in claim 12, further comprising:

detecting the user exiting a facility; and based at least in part on detecting that the user is exiting the facility, charging a payment instrument of the user for the price of the item.

14. A method comprising:

receiving, from an electronic device, first data associated with an inventory location that includes an associate, a weight sensor, and a vertical volume located above the inventory location, the first data representing a weight of an item that was removed, by the associate and for the user, from the inventory location;

determining a price of the item that is based at least in part on the weight and a price per unit weight associated with the item;

receiving sensor data generated by one or more sensors, the sensor data including data indicative of the one or more sensors detecting a portion of the associate located in the vertical volume and data indicative of the one or more sensors detecting the user was positioned next to the associate at the inventory location at a time that the portion of the associate was located in the vertical volume;

determining, based at least in part on the sensor data, that the item is associated with the user; and storing second data in association with an account of the user, the second data representing at least an identifier associated with the item and the price.

15. The method as recited in claim 14, further comprising:

detecting the user exiting a facility; and based at least in part on detecting that the user is exiting the facility, charging a payment instrument of the user for the price of the item.

16. The method as recited in claim 14, wherein determining that the item is associated with the user comprises determining that the user received the item from the associate.

17. The method as recited in claim 14, further comprising:

receiving additional sensor data generated by the one or more sensors; and determining, based at least in part on the additional sensor data, that the user removed the item from an area of the facility that includes the inventory location, and wherein storing the second data in association with the account of the user is based at least in part on determining that the user removed the item from the area.

18. The method as recited in claim 12, wherein determining that the item is associated with the user comprises determining that the user received the item from the associate.

19. The method as recited in claim 12, further comprising:

receiving additional sensor data generated by the one or more sensors; and determining, based at least in part on the additional sensor data, that the user removed the item from an area of the facility that includes the inventory location, and wherein storing the second data in association with the account of the user is based at least in part on determining that the user removed the item from the area.

* * * * *